(12) United States Patent
Lee et al.

(10) Patent No.: US 10,812,295 B2
(45) Date of Patent: Oct. 20, 2020

(54) SEARCH SPACE SET HASHING UNDER CHANNEL ESTIMATION CAPABILITY

(71) Applicant: QUALCOMM Incorporated, San Diego, CA (US)

(72) Inventors: Heechoon Lee, San Diego, CA (US); Jing Sun, San Diego, CA (US); Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/191,748

(22) Filed: Nov. 15, 2018

(65) Prior Publication Data

US 2019/0158317 A1  May 23, 2019

Related U.S. Application Data

(60) Provisional application No. 62/587,976, filed on Nov. 17, 2017.

(51) Int. Cl.
*H04L 27/28* (2006.01)
*H04L 25/02* (2006.01)
(Continued)

(52) U.S. Cl.
CPC ........ *H04L 25/0224* (2013.01); *H04L 1/0038* (2013.01); *H04L 5/0048* (2013.01);
(Continued)

(58) Field of Classification Search
None
See application file for complete search history.

(56) References Cited

U.S. PATENT DOCUMENTS

| 2008/0232495 A1* | 9/2008 | Yu ...................... H04L 5/0073 375/260 |
| 2012/0155316 A1* | 6/2012 | Li ...................... H04L 5/0053 370/252 |

(Continued)

FOREIGN PATENT DOCUMENTS

| KR | 20090083269 A | 8/2009 |
| KR | 20170095275 A | 8/2017 |

OTHER PUBLICATIONS

International Search Report and Written Opinion—PCT/US2018/061574—ISA/EPO—Feb. 14, 2019.

(Continued)

*Primary Examiner* — Sithu Ko
(74) *Attorney, Agent, or Firm* — Holland & Hart LLP

(57) ABSTRACT

Methods, systems, and devices for wireless communications are described. A network device such as a next generation (gNB) may identify control information for transmission on a downlink control channel e.g., a physical downlink control channel (PDCCH). The network device may identify a candidate set of decoding candidates to which the control information is able to be mapped. In some examples, each decoding candidate may include one or more control channel elements (CCEs). The network device may select, from the candidate set of decoding candidates, an actual set of decoding candidates to which the control information is to actually be mapped, and map the control information into the actual set of decoding candidates. Upon decoding the control information, the network device may transmit the control information within a search space including the actual set of decoding candidates to a user equipment (UE).

14 Claims, 16 Drawing Sheets

(51) Int. Cl.
H04L 1/00 (2006.01)
H04L 5/00 (2006.01)
H04W 72/04 (2009.01)

(52) U.S. Cl.
CPC ......... *H04L 5/0053* (2013.01); *H04W 72/042* (2013.01); *H04L 5/005* (2013.01); *H04L 5/0094* (2013.01)

(56) References Cited

U.S. PATENT DOCUMENTS

| | | | |
|---|---|---|---|
| 2013/0114529 A1* | 5/2013 | Chen | H04L 1/1829 370/329 |
| 2013/0201923 A1* | 8/2013 | Ren | H04L 5/0053 370/329 |
| 2014/0071918 A1* | 3/2014 | Park | H04L 5/0053 370/329 |
| 2014/0078980 A1* | 3/2014 | Frenne | H04L 5/0053 370/329 |
| 2014/0092821 A1* | 4/2014 | Zhu | H04L 1/1812 370/329 |
| 2014/0092836 A1* | 4/2014 | Park | H04W 72/042 370/329 |
| 2014/0314040 A1* | 10/2014 | Wang | H04W 72/10 370/329 |
| 2017/0006584 A1* | 1/2017 | Ren | H04B 7/2656 |
| 2018/0027574 A1* | 1/2018 | Lee | H04W 48/12 370/329 |
| 2018/0049189 A1* | 2/2018 | Hugl | H04L 5/0094 |

OTHER PUBLICATIONS

Vivo: "Discussion on Search Space and Blind Decoding Design," 3GPP Draft; R1-1712847_Discussion on Search Space and Blind Decoding Design, 3rd Generation Partnership Project (3GPP), Mobile Competence Centre; 650, Route Des Lucioles; F-06921 Sophia-Antipolis Ce, vol. RAN WG1, no. Prague, Czech Republic; Aug. 21, 2017-Aug. 25, 2017, Aug. 20, 2017, XP051315659, 6 pages, Retrieved from the Internet: URL: http://www.3gpp.org/ftp/Meetings_3GPP_SYNC/RAN1/Docs/ [retrieved on Aug. 20, 2017].

* cited by examiner

SEARCH SPACE SET HASHING UNDER CHANNEL ESTIMATION CAPABILITY

CROSS REFERENCES

The present Application for Patent claims the benefit of U.S. Provisional Patent Application No. 62/587,976 by LEE, et al., entitled "SEARCH SPACE SET HASHING UNDER CHANNEL ESTIMATION CAPABILITY," filed Nov. 17, 2017, assigned to the assignee hereof, and expressly incorporated by reference herein.

BACKGROUND

The following relates generally to wireless communication, and more specifically to search space set hashing under channel estimation capability.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some examples of wireless communications systems, a physical downlink control channel (PDCCH) carries data and signaling information to a UE, including downlink control information (DCI) messages. A DCI message includes information regarding downlink scheduling assignments, uplink resource grants, transmission scheme, uplink power control, hybrid automatic return repeat request (HARQ) information, modulation and coding schemes (MCS) and other information. A DCI message can be UE-specific (dedicated to a single UE) or cell-specific (common across multiple UEs) and placed in different dedicated and common search spaces within the PDCCH depending on a format of the DCI message. A UE attempts to decode a DCI by performing a process known as a blind decoding, during which multiple decode attempts are carried out in the dedicated and common search spaces until the DCI message is detected. Mapping the search spaces so that a UE may be more efficient at blind decoding and so that resources are optimally used is desirable.

SUMMARY

The described techniques relate to improved methods, systems, devices, or apparatuses that support search space set hashing under channel estimation capability. Generally, the described techniques provide for improved techniques for identifying decoding candidates at a specific aggregation level in next generation 5G or millimeter wave (mmW) new radio systems, by considering capabilities of a UE when constructing a search space. For example, capabilities of a UE may include how many blind decoding operations the UE can handle, or how many CCEs on which the UE can perform channel estimation for a downlink transmission and process a physical downlink control channel associated with the downlink transmission. To establish an improved search space, the base station may identify control information (e.g., downlink control information (DCI)) for transmission on a downlink control channel (e.g., physical downlink control channel (PDCCH)). The base station may identify a candidate set of decoding candidates to which the control information is able to be mapped, and select an actual set of decoding candidates to which the control information is to actually be mapped. Successively, the base station may map the control information into the actual set of decoding candidates, and transmit the control information within a search space including the actual set of decoding candidates to the UE. The UE may receive and decode the control information based on the set of decoding candidates.

A method for wireless communication at a base station is described. The method may include identifying control information for transmission on a downlink control channel, identifying a candidate set of decoding candidates to which the control information is able to be mapped, each decoding candidate comprising one or more CCEs, selecting, from the candidate set of decoding candidates, an actual set of decoding candidates to which the control information is to actually be mapped, mapping the control information into the actual set of decoding candidates, and transmitting the control information within a search space comprising the actual set of decoding candidates.

An apparatus for wireless communication is described. The apparatus may include means for identifying control information for transmission on a downlink control channel, means for identifying a candidate set of decoding candidates to which the control information is able to be mapped, each decoding candidate comprising one or more CCEs, means for selecting, from the candidate set of decoding candidates, an actual set of decoding candidates to which the control information is to actually be mapped, means for mapping the control information into the actual set of decoding candidates, and means for transmitting the control information within a search space comprising the actual set of decoding candidates.

Another apparatus for wireless communication is described. The apparatus may include a processor, memory in electronic communication with the processor, and instructions stored in the memory. The instructions may be operable to cause the processor to identify control information for transmission on a downlink control channel, identify a candidate set of decoding candidates to which the control information is able to be mapped, each decoding candidate comprising one or more CCEs, select, from the candidate set of decoding candidates, an actual set of decoding candidates to which the control information is to actually be mapped, map the control information into the actual set of decoding candidates, and transmit the control information within a search space comprising the actual set of decoding candidates.

A non-transitory computer-readable medium for wireless communication is described. The non-transitory computer-readable medium may include instructions operable to cause a processor to identify control information for transmission on a downlink control channel, identify a candidate set of decoding candidates to which the control information is able to be mapped, each decoding candidate comprising one or more CCEs, select, from the candidate set of decoding candidates, an actual set of decoding candidates to which the control information is to actually be mapped, map the control information into the actual set of decoding candidates, and transmit the control information within a search space comprising the actual set of decoding candidates.

Some examples of the method, apparatus, and non-transitory computer-readable medium described above for selecting the actual set of decoding candidates may further include processes, features, means, or instructions for evaluating decoding candidates of the candidate set sequentially for inclusion within the actual set of decoding candidates.

Some examples of the method, apparatus, and non-transitory computer-readable medium described above for selecting the actual set of decoding candidates may further include processes, features, means, or instructions for evaluating decoding candidates of the candidate set in accordance with an order of evaluation.

Some examples of the method, apparatus, and non-transitory computer-readable medium described above for evaluating each decoding candidate of the candidate set may further include processes, features, means, or instructions for identifying a decoding candidate of the candidate set to be evaluated, identifying a number of CCEs in the decoding candidate being evaluated, determining an evaluation number of CCEs by adding the number of CCEs in the decoding candidate being evaluated to a number of CCEs already included within the actual set, comparing the evaluation number of CCEs to a threshold, and determining whether to add the decoding candidate being evaluated to the actual set of decoding candidates based at least in part on the comparing.

In some examples of the method, apparatus, and non-transitory computer-readable medium described above, the threshold is a maximum number of CCEs on which a UE receiving the control information is able to perform channel estimation for a downlink transmission and process a physical downlink control channel associated with the downlink transmission.

Some examples of the method, apparatus, and non-transitory computer-readable medium described above may further include processes, features, means, or instructions for receiving, from the UE, an indication of the maximum number of CCEs on which the UE is able to perform channel estimation for the downlink transmission.

Some examples of the method, apparatus, and non-transitory computer-readable medium described above may further include processes, features, means, or instructions for determining the number of CCEs already included within the actual set by accounting for any overlapping CCEs of decoding candidates already included within the actual set.

Some examples of the method, apparatus, and non-transitory computer-readable medium described above for determining whether to add the decoding candidate being evaluated to the actual set of decoding candidates may further include processes, features, means, or instructions for adding the decoding candidate being evaluated to the actual set of decoding candidates based at least in part on when the evaluation number of CCEs is less than or equal to the threshold.

Some examples of the method, apparatus, and non-transitory computer-readable medium described above for determining whether to add the decoding candidate being evaluated to the actual set of decoding candidates may further include processes, features, means, or instructions for dropping the decoding candidate being evaluated and the candidate set of decoding candidates from the actual set of decoding candidates when the evaluation number of CCEs is greater than the threshold.

Some examples of the method, apparatus, and non-transitory computer-readable medium described above for determining whether to add the decoding candidate being evaluated to the actual set of decoding candidates may further include processes, features, means, or instructions for dropping the decoding candidate being evaluated from any inclusion in the actual set of decoding candidates when the evaluation number of CCEs is greater than the threshold.

Some examples of the method, apparatus, and non-transitory computer-readable medium described above may further include processes, features, means, or instructions for identifying an alternative decoding candidate, the alternative decoding candidate being of a same aggregation level as the decoding candidate being evaluated but not being within either the candidate set of decoding candidates or the actual set of decoding candidates, and adding the alternative decoding candidate to the actual set of decoding candidates.

Some examples of the method, apparatus, and non-transitory computer-readable medium described above for identifying the alternative decoding candidate may further include processes, features, means, or instructions for testing decoding candidates based at least in part on a sequentially increasing offset value.

Some examples of the method, apparatus, and non-transitory computer-readable medium described above for selecting the actual set of decoding candidates may further include processes, features, means, or instructions for identifying, from the candidate set of decoding candidates, a set of decoding candidates for each aggregation level, concatenating the sets of decoding candidates for each aggregation level into a single set of decoding candidates, accounting for any overlapping decoding candidates, and truncating the single set of decoding candidates to form the actual set of decoding candidates such that a number of CCEs in the actual set of decoding candidates does not exceed a maximum number of CCEs on which a UE receiving the control information is able to perform channel estimation for a downlink transmission. Some examples of the method, apparatus, and non-transitory computer-readable medium described above may further include processes, features, means, or instructions for randomizing the single set of decoding candidates based at least in part on a transmission slot, an identifier of the UE, or combinations of the same.

A method for wireless communication at a UE is described. The method may include receiving control information within a search space comprising a set of decoding candidates, and decoding the control information based at least in part on the set of decoding candidates.

An apparatus for wireless communication is described. The apparatus may include means for receiving control information within a search space comprising a set of decoding candidates, and means for decoding the control information based at least in part on the set of decoding candidates.

Another apparatus for wireless communication is described. The apparatus may include a processor, memory in electronic communication with the processor, and instructions stored in the memory. The instructions may be operable to cause the processor to receive control information within a search space comprising a set of decoding candidates, and decode the control information based at least in part on the set of decoding candidates.

A non-transitory computer-readable medium for wireless communication is described. The non-transitory computer-readable medium may include instructions operable to cause a processor to receive control information within a search space comprising a set of decoding candidates, and decode the control information based at least in part on the set of decoding candidates.

Some examples of the method, apparatus, and non-transitory computer-readable medium described above may further include processes, features, means, or instructions for transmitting, an indication of a maximum number of CCEs on which the UE is able to perform channel estimation for a downlink transmission and process a physical downlink control channel associated with the downlink transmission.

A method for wireless communication at a UE is described. The method may include identifying a candidate set of decoding candidates to which control information is able to be mapped, each decoding candidate comprising one or more CCEs, selecting, from the candidate set of decoding candidates, an actual set of decoding candidates on which the UE is actually able to decode the control information, and receiving the control information within a search space comprising the actual set of decoding candidates, wherein the control information is decoded based at least in part on the actual set of decoding candidates.

An apparatus for wireless communication is described. The apparatus may include means for identifying a candidate set of decoding candidates to which control information is able to be mapped, each decoding candidate comprising one or more CCEs, means for selecting, from the candidate set of decoding candidates, an actual set of decoding candidates on which the apparatus is actually able to decode the control information, and means for receiving the control information within a search space comprising the actual set of decoding candidates, wherein the control information is decoded based at least in part on the actual set of decoding candidates.

Another apparatus for wireless communication is described. The apparatus may include a processor, memory in electronic communication with the processor, and instructions stored in the memory. The instructions may be operable to cause the processor to identify a candidate set of decoding candidates to which control information is able to be mapped, each decoding candidate comprising one or more CCEs, select, from the candidate set of decoding candidates, an actual set of decoding candidates on which the apparatus is actually able to decode the control information, and receive the control information within a search space comprising the actual set of decoding candidates, wherein the control information is decoded based at least in part on the actual set of decoding candidates.

A non-transitory computer-readable medium for wireless communication is described. The non-transitory computer-readable medium may include instructions operable to cause a processor to identify a candidate set of decoding candidates to which control information is able to be mapped, each decoding candidate comprising one or more CCEs, select, from the candidate set of decoding candidates, an actual set of decoding candidates on which the apparatus is actually able to decode the control information, and receive the control information within a search space comprising the actual set of decoding candidates, wherein the control information is decoded based at least in part on the actual set of decoding candidates.

Some examples of the method, apparatus, and non-transitory computer-readable medium described above for selecting the actual set of decoding candidates may further include processes, features, means, or instructions for evaluating decoding candidates of the candidate set sequentially for inclusion within the actual set of decoding candidates.

Some examples of the method, apparatus, and non-transitory computer-readable medium described above for selecting the actual set of decoding candidates may further include processes, features, means, or instructions for evaluating decoding candidates of the candidate set in accordance with an order of evaluation.

Some examples of the method, apparatus, and non-transitory computer-readable medium described above for evaluating each decoding candidate of the candidate set may further include processes, features, means, or instructions for identifying a decoding candidate of the candidate set to be evaluated, identifying a number of CCEs in the decoding candidate being evaluated, determining an evaluation number of CCEs by adding the number of CCEs in the decoding candidate being evaluated to a number of CCEs already included within the actual set, comparing the evaluation number of CCEs to a threshold, and determining whether to add the decoding candidate being evaluated to the actual set of decoding candidates based at least in part on the comparing.

In some examples of the method, apparatus, and non-transitory computer-readable medium described above, the threshold is a maximum number of CCEs on which the UE is able to perform channel estimation for a downlink transmission associated with the control information.

Some examples of the method, apparatus, and non-transitory computer-readable medium described above may further include processes, features, means, or instructions for transmitting to a base station, an indication of the maximum number of CCEs on which the UE is able to perform channel estimation for the downlink transmission.

Some examples of the method, apparatus, and non-transitory computer-readable medium described above may further include processes, features, means, or instructions for determining the number of CCEs already included within the actual set by accounting for any overlapping CCEs of decoding candidates already included within the actual set.

Some examples of the method, apparatus, and non-transitory computer-readable medium described above for determining whether to add the decoding candidate being evaluated to the actual set of decoding candidates may further include processes, features, means, or instructions for adding the decoding candidate being evaluated to the actual set of decoding candidates based at least in part on when the evaluation number of CCEs is less than or equal to the threshold.

Some examples of the method, apparatus, and non-transitory computer-readable medium described above for determining whether to add the decoding candidate being evaluated to the actual set of decoding candidates may further include processes, features, means, or instructions for dropping the decoding candidate being evaluated from the actual set of decoding candidates when the evaluation number of CCEs is greater than the threshold.

Some examples of the method, apparatus, and non-transitory computer-readable medium described above for determining whether to add the decoding candidate being evaluated to the actual set of decoding candidates may further include processes, features, means, or instructions for dropping the decoding candidate being evaluated from any inclusion in the actual set of decoding candidates when the evaluation number of CCEs is greater than the threshold.

Some examples of the method, apparatus, and non-transitory computer-readable medium described above may further include processes, features, means, or instructions for identifying an alternative decoding candidate, the alternative decoding candidate being of a same aggregation level as the decoding candidate being evaluated but not being within either the candidate set of decoding candidates or the actual set of decoding candidates, and adding the alternative decoding candidate to the actual set of decoding candidates.

Some examples of the method, apparatus, and non-transitory computer-readable medium described above for identifying the alternative decoding candidate may further include processes, features, means, or instructions for testing decoding candidates based at least in part on a sequentially increasing offset value.

Some examples of the method, apparatus, and non-transitory computer-readable medium described above for selecting the actual set of decoding candidates may further include processes, features, means, or instructions for identifying, from the candidate set of decoding candidates, a set of decoding candidates for each aggregation level, concatenating the sets of decoding candidates for each aggregation level into a single set of decoding candidates, accounting for any overlapping decoding candidates, and truncating the single set of decoding candidates to form the actual set of decoding candidates such that a number of CCEs in the actual set of decoding candidates does not exceed a maximum number of CCEs on which a UE receiving the control information is able to perform channel estimation for a downlink transmission.

Some examples of the method, apparatus, and non-transitory computer-readable medium described above may further include processes, features, means, or instructions for randomizing the single set of decoding candidates based at least in part on a transmission slot, an identifier of the UE, or combinations of the same.

DETAILED DESCRIPTION

Figure 1:
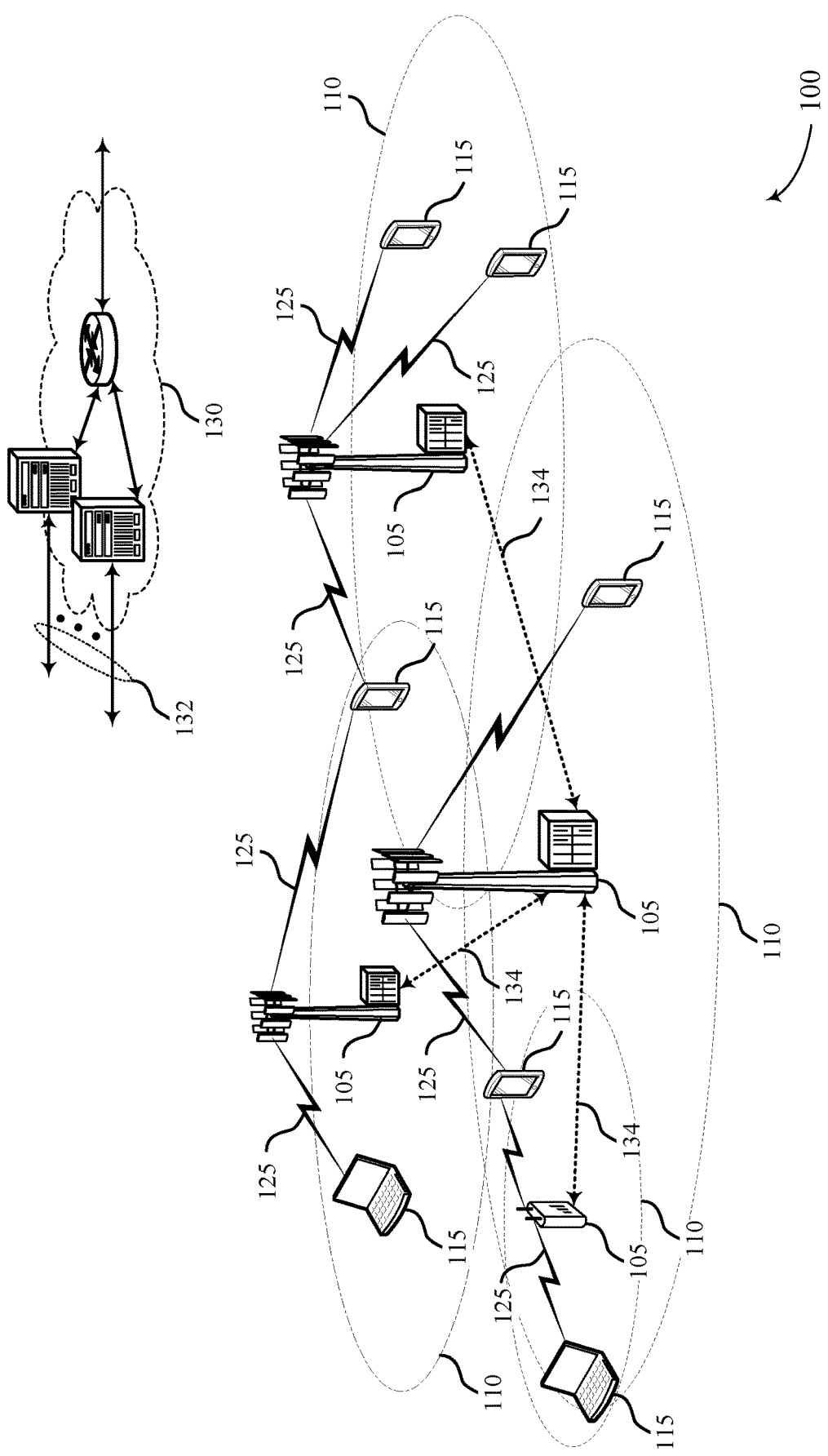
FIG. 1 illustrates an example of a system for wireless communication that supports search space set hashing under channel estimation capability in accordance with aspects of the present disclosure.

The described techniques relate to improved methods, systems, devices, or apparatuses that support search space set hashing under channel estimation capability. A base station may encode and transmit control information to a UE on a physical downlink control channel (PDCCH). For example, a PDCCH carries downlink control information (DCI). DCI may include information regarding downlink scheduling assignments, uplink resource grants, transmission scheme, uplink power control, hybrid automatic return repeat request (HARD) information, modulation and coding schemes (MCS) and other information. Some control information may be common across multiple UEs (common DCI), and some control information may be specific to a single UE (a dedicated DCI). Common control information may be included in a PDCCH transmission as part of a common search space, and dedicated control information may be included in a PDCCH transmission as part of a dedicated (UE-specific) search space.

A UE may be configured to search one or more common or dedicated search spaces for control information (e.g., DCI on a PDCCH) applicable to the UE. The UE attempts to decode the control information through a process known as a blind decoding, during which the UE carries out multiple decode attempts in the dedicated and common search spaces until appropriate control information is detected. Blind decoding of the search space may inefficiently require duplicative decoding of control information mapped to control channel elements (CCEs) within the search space. For example, each search space, common or dedicated, may include multiple decoding candidates for the UE to decode, with each decoding candidate corresponding to a particular CCE or group of CCEs within the search space. A UE may be informed of two or more possible lengths of a control message and attempts to decode multiple decoding candidates corresponding to the two or more possible lengths. Because of the inefficiency, and the conventional way control information (e.g., on a PDCCH) is encoded, the UE needs to decode multiple decoding candidates before identifying the control information appropriate for the UE.

A base station and UE may improve techniques for identifying decoding candidates at a specific aggregation level in next generation 5G or millimeter wave (mmW) new radio systems, by considering capabilities of the UE when selecting decoding candidates in a search space. For example, capabilities of a UE may include how many blind decoding operations the UE can handle, or how many CCEs on which the UE can perform channel estimation for a downlink transmission. To establish an improved search space, the base station may identify control information for transmission on a downlink control channel. The base station may identify a candidate set of decoding candidates to which the control information is able to be mapped. Each decoding candidate may include one or more CCEs. The base station may select, from the candidate set of decoding candidates, an actual set of decoding candidates to which the control information is to actually be mapped, and map the control information into the actual set of decoding candidates. As a result, the base station may transmit the control information within a search space including the actual set of decoding candidates to the UE. The UE may receive and decode (e.g., via blind decoding) the control information based on the set of decoding candidates.

Aspects of the disclosure are initially described in the context of a wireless communications system. Exemplary UEs and base stations (e.g., next generation (gNBs)), systems, methods, and process flow that supports search space set hashing under channel estimation capability are then described. Aspects of the disclosure are further illustrated by and described with reference to apparatus diagrams, system diagrams, and flowcharts that relate to search space set hashing under channel estimation capability.

FIG. 1 illustrates an example of a system 100 in accordance with various aspects of the present disclosure. System 100 includes base stations 105, UEs 115, and a core network 130. In some examples, system 100 may be a Long Term Evolution (LTE) network, an LTE-Advanced (LTE-A) network, or a New Radio (NR) network. In some cases, system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. System 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. System 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and system 100 may be configured to provide ultra-reliable communications for these functions.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

System 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. System 100 may also operate in an extremely high frequency (EHF) region of the spectrum (e.g., from 30 GHz to 300 GHz), also known as the millimeter band. In some examples, system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

Base station 105 may transmit a control channel, such as a physical downlink control channel (PDCCH), in order to convey a downlink control information (DCI) message including control information to UE 115. The DCI message can be UE-specific (dedicated) or cell-specific (common) and placed in different dedicated and common search spaces within the PDCCH. A single PDCCH may carry DCI messages associated with multiple UEs 115. A particular UE 115 must, therefore, be able to recognize the DCI messages that are intended for it. To that end, a UE 115 may be assigned one or more UE-specific search spaces, which may be in addition to common search spaces allocated to the UE 115 as well as other UEs 115 in the system 100. The UE 115 may attempt to decode the DCI by performing a process known as a blind decode, during which multiple decode attempts are carried out in the search spaces until the DCI message is detected.

Base station 105 may improve techniques for identifying decoding candidates at a specific aggregation level, by considering capabilities of a UE 115 when selecting decoding candidates in a search space. The search space may be divided into a common search space and a UE-specific search space. In some cases, base station 105 may identify control information for transmission on a downlink control channel. The downlink control channel may be a PDCCH. Base station 105 may identify a candidate set of decoding candidates to which the control information is able to be mapped. Each decoding candidate including one or more control channel elements (CCEs). Base station 105 may select, from the candidate set of decoding candidates, an actual set of decoding candidates to which the control information is to actually be mapped, and map the control information into the actual set of decoding candidates. Base station 105 may transmit the control information within a search space including the actual set of decoding candidates to UE 115 via communication link 125.

UE 115 may receive and decode the control information based on the set of decoding candidates. In some examples, UEs 115 may identify a candidate set of decoding candidates to which the control information is mapped, each decoding candidate may include one or more CCEs. The UEs 115 may select, from the candidate set of decoding candidates, an actual set of decoding candidates on which the UEs 115 may decode for the control information. That is, the UEs 115 may decode the control information based at least in part on the actual set of decoding candidates, and receive the control information within the search space including the actual set of decoding candidates.

The UEs 115 may evaluate decoding candidates of the candidate set in accordance with an order of evaluation, the order being based at least in part on an aggregation level of the decoding candidates of the candidate set. In some examples, the UEs 115 may identify a decoding candidate of the candidate set to be evaluated, and a number of CCEs in the decoding candidate being evaluated. Following the identification, the UEs 115 may determine an evaluation number of CCEs by adding the number of CCEs in the decoding candidate being evaluated to a number of CCEs already included within the actual set, and compare the evaluation number of CCEs to a threshold. The UEs 115 may determine whether to add the decoding candidate being evaluated to the actual set of decoding candidates based at least in part on the comparing. In some examples, the threshold may be a maximum number of CCEs on which the UEs 115 are able to perform channel estimation for a downlink transmission and process a physical downlink control channel associated with the downlink transmission. In some cases, the UEs 115 may provide an indication of the maximum number of CCEs on which the UEs 115 are able to perform channel estimation for the downlink transmission to the base stations 105.

In some cases, the base stations 105 and/or the UEs 115 may determine the number of CCEs already included within the actual set by accounting for any overlapping CCEs of decoding candidates already included within the actual set. In some cases, the base station 105 and/or the UEs 115 may add the decoding candidate being evaluated to the actual set of decoding candidates based on when the evaluation number of CCEs is less than or equal to the threshold. Alternatively, the base station 105 and/or the UEs 115 may drop the decoding candidate being evaluated and the candidate set of decoding candidates from the actual set of decoding candidates when the evaluation number of CCEs is greater than the threshold. In some cases, the base station 105 and/or the UEs 115 may drop the decoding candidate being evaluated from any inclusion in the actual set of decoding candidates when the evaluation number of CCEs is greater than the threshold. The bases stations 105 and/or the UEs 115 may identify an alternative decoding candidate. The alternative decoding candidate being of a same aggregation level as the decoding candidate being evaluated but not being within either the candidate set of decoding candidates or the actual set of decoding candidates, and add the alternative decoding candidate to the actual set of decoding candidates. The base stations 105 and/or the UEs 115 may test decoding candidates based at least in part on a sequentially increasing offset value.

The base stations 105 and/or the UEs 115 may select an actual set of decoding candidates by identifying, from the candidate set of decoding candidates, a set of decoding candidates for each aggregation level, and concatenating the sets of decoding candidates for each aggregation level into a single set of decoding candidates, accounting for any overlapping decoding candidates. The base station 105 may truncate the single set of decoding candidates to form the actual set of decoding candidates such that a number of CCEs in the actual set of decoding candidates does not exceed a maximum number of CCEs on which the UEs 115 receiving the control information is able to perform channel estimation for a downlink transmission and process a physical downlink control channel associated with the downlink transmission. The base station 105 may randomize the single set of decoding candidates based at least in part on a transmission slot, an identifier of the UE, or combinations of the same.

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers. A carrier may be associated with a particular bandwidth of the radio frequency spectrum, and in some examples the carrier bandwidth may be referred to as a "system bandwidth" of the carrier or the system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

System 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers. In some cases, system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable. Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
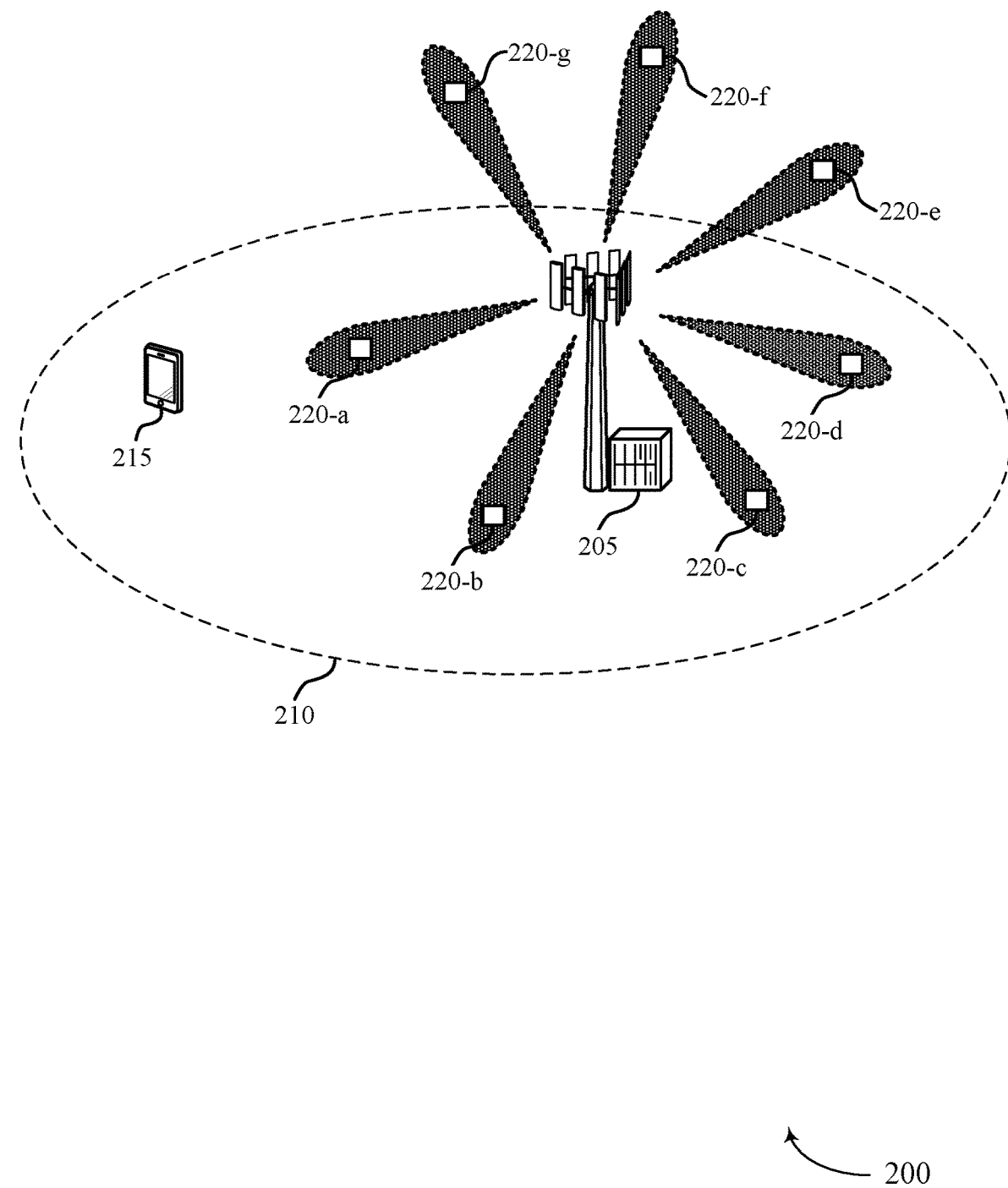
FIG. 2 illustrates an example of a system for wireless communication that supports search space set hashing under channel estimation capability in accordance with aspects of the present disclosure.

FIG. 2 illustrates an example of a system 200 for wireless communication that supports search space set hashing under channel estimation capability in accordance with various aspects of the present disclosure. In some examples, system 200 may implement aspects of system 100. System 200 may include base station 205 and UE 215, which may be examples of the corresponding devices described with reference to FIG. 1. System 200 may operate according to a radio access technology such as a next generation 5G or millimeter wave (mmW) new radio system, although techniques described herein may be applied to any radio access technology (e.g., Long-Term Evolution (LTE), LTE-advanced (LTE-A)) and to systems that may concurrently use two or more different radio access technologies (e.g., next generation 5G mmW new radio and LTE). Base station 205 may improve techniques for identifying decoding candidates at a specific aggregation level in next generation 5G or mmW new radio systems, by considering capabilities of a UE 215 when selecting decoding candidates in a search space. In some cases, base station 205 may establish (i.e., construct, set, define) an improved search space prior to transmission of control information to UE 215. The improved search space may decrease a power consumption for UE 215, by having an better selection of decoding candidates in the search space, for decoding of the control information. Aspects of the following communication examples are described as occurring between base station 205 and UE 215.

Base station 205 may be associated with a coverage area 210. The coverage area 210 may be associated with one or more cells. For example, base station 205 may provide communication coverage for a macro cell, a small cell, a hot spot, or other types of cells, or various combinations thereof. Base station 205 may facilitate a downlink transmission to UE 215 or an uplink transmission from UE 215. That is, base station 205 may control the downlink transmission or the uplink transmission to and from UE 215. For example, base station 205 may transmit scheduling information to UE 215 indicating time and frequency resources associated with downlink transmissions. The scheduling information may indicate to UE 215 time and frequency resources (e.g., a subcarrier, a slot, a symbol, a subframe) related to transmissions from base station 205. For example, the scheduling information may indicate when base station 205 may transmit downlink data including a coding scheme, a data size, HARQ information, among others to UE 215. In some cases, the scheduling information may also indicate to UE 215 time and frequency resources (e.g., a subcarrier, a slot, a symbol, a subframe) allocated for uplink transmissions to base station 205.

Base station 205 may perform a radio resource control (RRC) procedure (e.g., cell acquisition procedure, random access procedure, RRC connection procedure, RRC configuration procedure) with UE 215. As part of the RRC procedure, base station 205 may schedule and allocate resources for UE 215. The schedule may include information indicating to UE 215 scheduled symbols allocated for UE 215 for downlink transmission and uplink transmissions.

In some cases, base station 205 and UE 215 may communicate according a control-plane protocol and a user-plane protocol. Base station 205 and UE 215 may use the control-plane protocol to communicate control messages including control information (e.g., uplink resource allocation, a power control command, a channel state information (CSI) report or channel quality indicator (CQI) report, etc.). Base station 205 and UE 215 may use the user-plane protocol to communicate data. The control-plane protocol may include a number of layers. For example, the control-plane protocol may include a physical (PHY) layer, a medium access control (MAC) layer, a radio link control (RLC) layer, a packet data convergence protocol (PDCP) layer, a radio resource control (RRC) layer, among others.

The PHY layer may be part of a layer 1 (L1) of the control-plane or the user-plane protocol. The PHY layer may communicate and provide information to a higher layer using one or more physical channels. For example, the PHY layer may be in communication (e.g., connected) to the MAC layer. The communication between the PHY layer and the MAC layer may be via one or more transport channels. A transport channel may communicate information between the PHY layer and the MAC layer. Information may be communicate on a physical channel between a PHY layer of a transceiver (e.g., a receiver or a transmitter) of base station 205 or UE 215. In some cases, the MAC layer may also be part of the L2 of the control-plane or the user-plane protocol. The MAC layer may communicate and provide information to a next higher layer using one or more logical channels. For example, the MAC layer may be in communication with the RLC layer. The RLC layer may support reliable transmission of information for base station 205 or UE 215. In some cases, the PDCP layer may be part of the L2 of the control-plane or the user-plane protocol, and provide information compression to reduce an amount of control information transmitted from base station 205 to UE 215. The RRC layer may be part of a layer 3 (L3) of the control-plane protocol. The RRC layer may facilitate logical channels, transport channels, and physical channels for configuration, reconfiguration, and release of a connection between base station 205 and UE 215.

An example of a logical channel may include a dedicated traffic channel (DTCH), a dedicated control channel (DCCH), a broadcast control channel (BCCH), a paging control channel (PCCH), a common control channel (CCCH), a multicast traffic channel (MTCH), and a multicast control channel (MCCH). An example of a transport channel may include uplink shared channel (UL-SCH), a random access channel (RACH), a downlink shared channel (DL-SCH), a paging channel (PCH), a broadcast channel (BCH), and a multicast channel (MCH). Physical channel may include physical data channels and physical control channel. An example of a physical data channel may include a physical uplink shared channel (PUSCH), a physical random access channel (PRACH), a physical downlink shared channel (PDSCH), a physical broadcast channel (PBCH), and a physical multicast channel (PMCH). An example of a physical control channel may include physical uplink control channel (PUCCH), physical control format indicator channel (PCFICH), a physical hybrid ARQ indicator channel (PHICH), a physical downlink control channel (PDCCH), among others.

Base station 205 may be configured with multiple antennas, which may be used for directional or beamformed transmissions (e.g., beamformed transmissions 220-a through 220-g). In some examples, the RRC procedure may include a beam sweep procedure. As illustrated, base station 205 may transmit a number of beamformed transmissions 220-a through 220-g in different directions within the coverage area 210. Base station 205 may indicate the allocated resources for UE 215 in control information. For example, base station 205 may indicate the allocated resources in a downlink control information (DCI) transmitted to UE 215 on a broadcast channel e.g., PDCCH, using at least one of the beamformed transmissions 220.

An example frame structure in next generation 5G mmW new radio systems may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. Each frame may include 10 subframes numbered from 0 to 9, and each subframe may have a duration of 1 ms.

A subframe may be further divided into 2 slots each having a duration of 0.5 ms, and each slot may contain 14 modulation symbol periods (e.g., OFDM symbols). In some cases, a subframe or a slot may be a scheduling unit of system 200. In some cases, base station 205 may assign a number of symbols in the slot for a control region. For example, base station 205 may assign the first one to three symbols (e.g., S0, S1, and/or S2) of the slot for the control region. The remainder symbols (e.g., S1-S13, S2-S13, or S3-S13) may be assigned for a data region. In some cases, base station 205 may transmit reference signals in a preconfigured pattern within a slot or a subframe irrespective of the control region and the data region. Base station 205 may allocate resources, unassigned for reference signal transmission, to control channels. In some examples, the control channels may include PCFICH and PDCCH. Similarly, base station 205 may allocate resources, unassigned for reference signal transmission in the data region, to data channels.

In some cases, base station 205 may indicate a number of symbols used for PDCCH in every slot or subframe to UE 215 via PCFICH. The PCFICH may occupy a first symbol of a slot or a subframe and include four resource element groups (REGs). Each REG may be distributed across a control region based on a cell identity, for example, associated with base station 205. In some examples, one REG may include a number of resource elements (REs). A RE may be a minimum resource defined as one subcarrier by one symbol (i.e., OFDM symbol). The PDCCH may be allocated to a number of symbols of a slot or a subframe. The PDCCH may include a number of control channel elements (CCEs). Each CCE may include a number of REGs (e.g., 9 REGs). Base station 205 may provide scheduling (e.g., resource allocation for downlink data, uplink scheduling grant, and HARQ information) for UE 215 as part of control information transmitted on the PDCCH. In some cases, base station 205 may provide information on the PDCCH that may be associated with a location (e.g., RE or REG in a slot or a subframe) associated with data transmission and how UE 215 may receive and decode a PDSCH carrying downlink data from base station 205.

UE 215 may monitor for a PDCCH in a slot or a subframe. To determine if a PDCCH including a number of CCEs is transmitted from base station 205 to UE 215, UE 215 may be configured to monitor $M^{(L)}$ CCEs that may be configured contiguously or based on a configuration rule, where L may be a CCE aggregation level indicating a number of CCEs in a PDCCH and $M^{(L)}$ may indicate a number of candidate PDCCHs (i.e., a candidate set of decoding candidates). As such, in a control region carrying PDCCH of a slot or a subframe, there can be many positions where a specific PDCCH may be located, and UE 215 may search all possible locations. In some cases, UE 215 may search these locations based on a search space.

In some examples, a search space may be a UE-specific search space or a common search space. UE 215 may monitor for a PDCCH in a UE-specific search space with CCE aggregation levels 1, 2, 4, and 8. Alternatively, UE 215 may monitor for the PDCCH in a common search space with CCE aggregation levels 4 and 8. In some cases, the UE-specific search space and the common search space may overlap. In some cases, for each CCE aggregation level, a position of a first CCE of a PDCCH search space allocated by base station 205 to UE 215 may differ per slot or subframe. This variation may be referred to as PDCCH search space hashing. Base station 205 may provide possible positions of decoding candidates in a search space to UE 215.

Base station 205 may establish an improved search space (i.e., construct, set, define, perform PDCCH search space hashing) for transmission of control information to UE 215 prior to transmission of a PDCCH (carrying the control information) to UE 215. The search space may include a number of decoding candidates for the PDCCH. By establishing the search space in advance of transmitting the control information to UE 215, system 200 may produce improved efficiency and operating characteristics for UE 215. For example, UE 215 may have reduced power consumption because UE 215 may not have to perform extensive blind decoding on all decoding candidates in a less robust search space. That is, UE 215 may have a reduced number of decoding candidates to perform blind decoding on in the improved search space compared to conventional systems.

Conventional systems such as LTE systems may use enhanced PDCCH (ePDCCH) search space hashing to identify decoding candidates for a PDCCH. For instance, conventional systems may use the following equation (1) for identifying decoding candidates at a specific aggregation level L:

$$L\left\{\left(Y_{p,k} + \left[\frac{m \cdot N_{ECCE,p,k}}{L \cdot M_p^{(L)}}\right] + b\right) \bmod \left[\frac{N_{ECCE,p,k}}{L}\right]\right\} + i \quad (1)$$

where L is an aggregation level, i ranges from 0, ..., L−1, $Y_{p,k}$ may be a variable, $N_{ECCE,p,k}$ may be a number of enhanced CCEs (eCCEs) included in a resource block set p of a subframe k, $M_p^{(L)}$ may be a number of ePDCCH candidates at the specific aggregation level, and b may indicate an offset value associated with a carrier index.

Given Y, a baseline design may be a conservative approach of selecting decoding candidates profiles. For example, $Y=M_8 \times 8+M_4 \times 4+M_2 \times 2+M_1 \times 1$, where $M_i$ may be a number of decoding candidates for an aggregation level i. This may result in a restricted combination of decoding candidates (i.e., ($M_8$, $M_4$, $M_2$, $M_1$)) for base station 205 selection. As such, this may be too conservative of an approach with respect to overlapping (e.g., partial overlap) across decoding candidates that may be overlooked—not considered—by base station 205. In addition, due to randomness in hashing, overlapping may not be provided for all slots or subframes.

Base station 205 may improve techniques for identifying decoding candidates at a specific aggregation level in next generation 5G or mmW new radio systems, by considering capabilities of UE 215 when constructing the search space. For example, capabilities of UE 215 may include how many blind decoding operations UE 215 can handle, or how many CCEs on which UE 215 can perform channel estimation for a downlink transmission. In some cases, these example UE capabilities may be independent or may be bundled with UE carrier aggregation capability.

Base station 205 may provide sequential derivation of decoding candidates while considering UE capabilities. Initially, as described herein, base station 205 may identify control information for transmission on a PDCCH. Base station 205 may identify a candidate set of decoding candidates to which the control information is able to be mapped. Each decoding candidate may include one or more CCEs. In some cases, base station 205 may use ePDCCH search space hashing to identify the candidate set of decoding candidates. Base station 205 may select, from the candidate set, an actual set of decoding candidates to which the control information is to actually be mapped.

In some cases, base station 205 may evaluate decoding candidates of the candidate set sequentially for inclusion within the actual set of decoding candidates. Alternatively, base station 205 may evaluate decoding candidates of the candidate set in accordance with an order of evaluation. The order may be based on an aggregation level of the decoding candidates of the candidate set. For example, the order may initialize from a higher aggregation level (e.g., aggregation level 8) and proceed sequentially to lower aggregation levels (e.g., aggregation level 4 for common search space or aggregation levels 4, 2, and 1 for UE-specific search space). Within each aggregation level, base station 205 may sequentially assess each decoding candidate starting from a first decoding candidate (m=0) to $M_p^{(L)}$ i.e., a maximum number of decoding candidates at the specific aggregation level.

Base station 205 may also identify a decoding candidate of the candidate set to be evaluated and identify a number of CCEs in the decoding candidate being evaluated. Base station 205 may then determine an evaluation number of CCEs (e.g., a CCE count) by adding the number of CCEs in the decoding candidate being evaluated to a number of CCEs already included within the actual set. Base station 205 may compare the evaluation number of CCEs to a threshold (e.g., Y including number of decoding candidates for an aggregation level). As described herein, the threshold may be a maximum number of CCEs on which UE 215 is able to perform channel estimation for a downlink transmission and process a physical downlink control channel associated with the downlink transmission. In some examples, base station 205 may receive from UE 215 an indication of the maximum number of CCEs e.g., during an RRC connection procedure.

Based on the comparison, base station 205 may determine whether to add the decoding candidate being evaluated to the actual set of decoding candidates. Base station 205 may also determine the number of CCEs already included within the actual set by accounting for any overlapping CCEs of decoding candidates already included within the actual set to determine whether to add the decoding candidate being evaluated to the actual set. In some cases, base station 205 may add the decoding candidate being evaluated to the actual set of decoding candidates based on when the evaluation number of CCEs is less than or equal to the threshold. Alternatively, base station 205 may drop the decoding candidate being evaluated from any inclusion in the actual set of decoding candidates when the evaluation number of CCEs is greater than the threshold. Additionally, or alternatively, the base station 205 may drop the decoding candidate being evaluated and the candidate set of decoding candidates from the actual set of decoding candidates when the evaluation number of CCEs is greater than the threshold. As a result, base station 205 may for each decoding candidate, check how many CCEs are used so far in the actual set plus the evaluated decoding candidate. If the CCE count exceeds Y, base station 205 may drop the decoding candidate. Otherwise, base station 205 may add the decoding candidate to the actual set. As described, the CCE count may also consider partial overlapping of CCEs across all previous hashed decoding candidates. The end result may be a subset of the decoding candidates from the hashing that may be selected by base station 205 for actual PDCCH transmission. In addition, the channel estimation footprint for UE 215 may not exceed Y.

In some cases, as described previously, PDCCH may carry scheduling and other control information. Because location and size associated with DCI are not known to UE 215, blind decoding excessive decoding candidates in a search space may be performed by UE 215. The complex structure of PDCCH blind decoding may result in unwarranted false blind decoding results. However, if a coreset (control resource element set) is too small, there may not be any pruning required for blind decoding results. In some cases, the actual set of decoding candidates may, in some cases, be smaller than a profile configured due to pruning. As such, base station 205 may instead of dropping the decoding candidate being evaluated from any inclusion in the actual set of decoding candidates when the evaluation number of CCEs is greater than the threshold, base station 205 may shift the candidate by searching and identifying another candidate of a same aggregation level to add to the actual set. For example, base station 205 may identify an alternative decoding candidate that is of the same aggregation level as the decoding candidate being evaluated but not being within either the candidate set of decoding candidates or the actual set of decoding candidate. Base station 205 may identify the alternative candidate, base station 205 may add the alternative decoding candidate to the actual set.

Base station 205 may assess decoding candidates based on a sequentially increasing offset value. For example, base station 205 may apply a parameter c (e.g. an offset term) in addition to b of equation (1). Base station 205 may increment a value of c from zero till base station 205 identifies a candidate where the evaluation number of CCEs does not exceed the threshold (e.g., Y), and that is not in the candidate set and not in the actual set.

In some cases, base station 205 may use a nominal maximum number of decoding candidates for each of the set of aggregation levels to derive a set of CCEs. That is, base station 205 may identify, from the candidate set of decoding candidates, a set of decoding candidates for each aggregation level. Base station 205 may concatenate a set of CCEs and truncate the CCEs beyond the threshold (e.g., Y). For example, base station 205 may concatenate the sets of decoding candidates for each aggregation level into a single set of decoding candidates, accounting for any overlapping decoding candidates. In some examples, base station 205 may truncate the single set of decoding candidates to form the actual set of decoding candidates such that a number of CCEs in the actual set of decoding candidates does not exceed a maximum number of CCEs on which UE 215 receiving the control information is able to perform channel estimation for a downlink transmission. In some cases, since the location of CCEs for aggregation levels are random, the truncating of CCEs may have a random impact on different aggregation levels i.e., it may not penalize decoding candidates of higher aggregation levels (e.g., aggregation level 8). As such, base station 205 may randomize the single set of decoding candidates based on a transmission slot (e.g., 0 to Y−1, 1 to Y, or 2 to Y+1), an identifier of the UE (e.g., UE-specific number), or combinations of the same.

In some cases for randomization, base station 205 may begin with an offset aligned with a size of a largest aggregation level associated with a set of decoding candidates. The offset may be associated with a random integer value. For example, instead of a random integer value, base station 205 may apply a random integer multiple of a largest aggregation level of a decoding set, or a largest aggregation level of a coreset. In some cases, the random integer value may be a fixed size e.g., an aggregation level 8. Alternatively, in the case of no offset there may be some decoding candidate partially included in the Y. For example, if all decoding candidates are associated with an aggregation level 8, but a randomization starting position is 1, then an aggregation level 8 decoding candidate may be partially in the Y. As a result, this decoding candidate may be dropped by base station 205. In some case, after truncating a decoding candidate, base station 205 may truncate (e.g., drop) another decoding candidate if the candidate is partially in Y. Base station 205 may test all starting positions and generate a window of length Y, and select a starting position with the largest number of decoding candidates within the window of length Y. In some examples, the window may not be randomized.

Base station 205 may after constructing the actual set of decoding candidates to which the control information is to actually be mapped, map the control information into the actual set of decoding candidates. Base station 205 may transmit the control information within a search space including the actual set of decoding candidates to UE 215 via beamformed transmission 220-a. UE 215 may receive the control information within the search space via beamformed transmission 220-a, and decode the control information based on the set of decoding candidates.

In the above description of the system 200, the operations performed by the base station 205 and the UE 215 may be interchangeable. For example, one or more operations performed by the base station 205 may additionally, or alternatively be performed by the UE 215, vice versa. Certain operations may also be left out by the base station 205 and/or the UE 215, or other operations may be added by the base station 205 and/or the UE 215.

Figure 3:
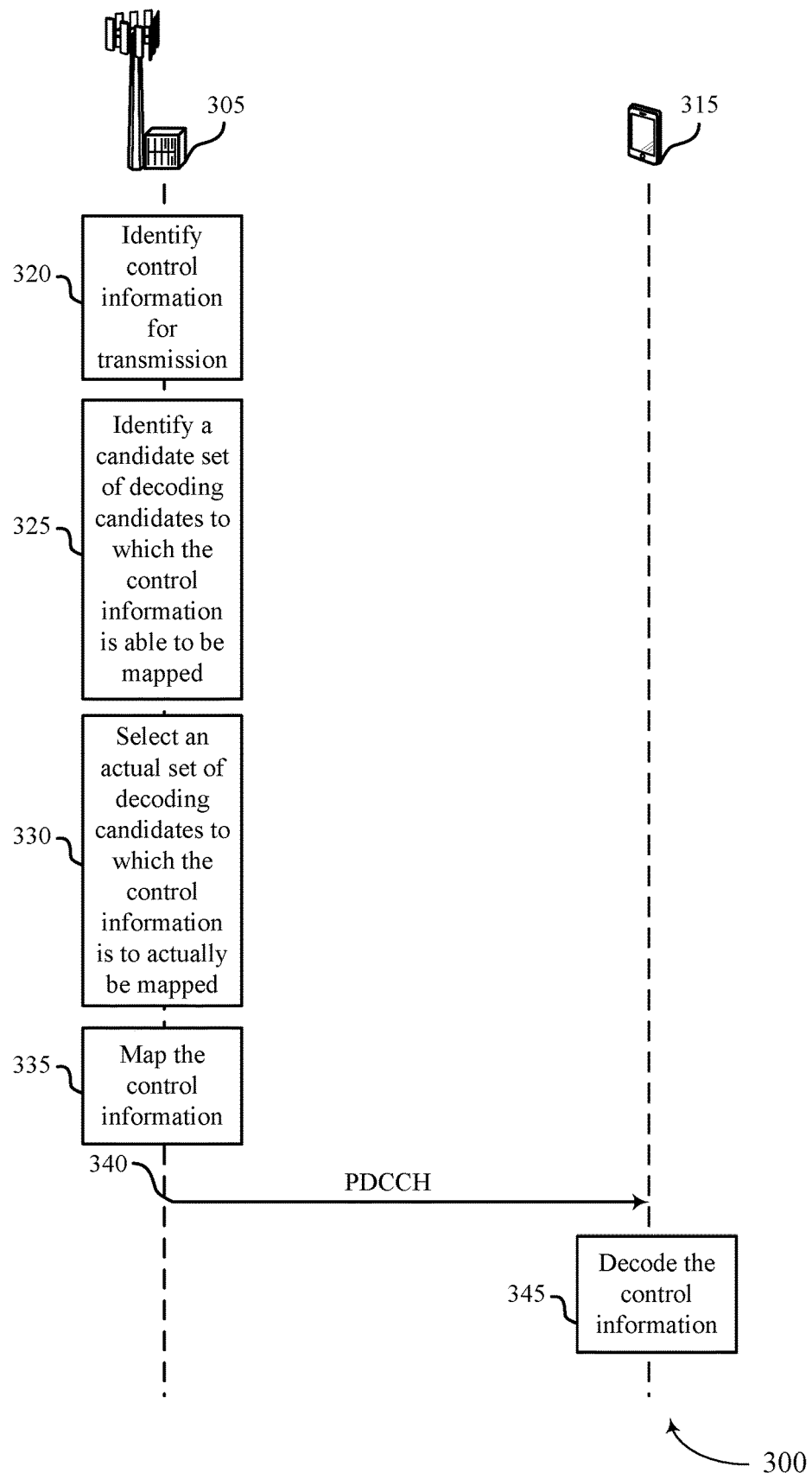
FIG. 3 illustrates an example of a process flow that supports search space set hashing under channel estimation capability in accordance with aspects of the present disclosure.

FIG. 3 illustrates an example of a process flow 300 that supports search space set hashing under channel estimation capability in accordance with various aspects of the present disclosure. In some examples, process flow 300 may implement aspects of system 100 and 200. Base station 305 and UE 315 may be examples of the corresponding devices described with reference to FIGS. 1 and 2.

In the following description of the process flow 300, the operations between the base station 305 and UE 315 may be transmitted in a different order than the exemplary order shown, or the operations performed by base station 305 and UE 315 may be performed in different orders or at different times. Certain operations may also be left out of the process flow 300, or other operations may be added to the process flow 300.

In some examples, process flow 300 may commence with base station 305 establishing a connection with UE 315 (e.g., performing a RRC connection procedure with each). For example, UE 315 may enter a cell associated with base station 305, and perform an initial cell search. As part of the initial cell search, UE 315 may obtain synchronization with base station 305. In some examples, UE 315 may synchronize timing information with base station 305 and receive a cell identifier from base station 305. UE 315 may receive the cell identifier via primary synchronization channel or a secondary synchronization channel, or both associated with base station 305. Synchronization may include coordinating timing information of UE 315 to timing information of base station 305.

After synchronization with base station 305, UE 315 may receive system information from base station 205. For example, base station 305 may transmit system information to UE 315 on a PDCCH. In some cases, UE 315 may perform a random access procedure with base station 305. As part of the random access procedure, UE 315 may transmit a preamble on a PRACH to base station 305. Base station 350 may transmit a response to the preamble on a PDCCH.

The PDCCH may carry a DCI including control information such as resource allocation information for UE 215. At 320, base station 305 may identify control information for transmission on a downlink control channel (i.e., PDCCH) to UE 315. In some cases, prior to the PDCCH transmission, base station 205 may establish a search space of the PDCCH for UE 215. The search space may include many positions where a specific PDCCH is located and UE 315 may search all the possible locations. All the possible locations for PDCCH may be referred to as the search space and each of the possible location may be referred to as a PDCCH candidates.

The possible location for a PDCCH differs depending on whether the PDCCH is UE-specific or common, and also depend on what aggregation level is used by base station 305. The search space may indicate a set of CCE locations where UE 315 may identify a PDCCH associated with UE 315. Each PDCCH may also carry the DCI and may be identified based on a radio network temporary identifier (RNTI). The RNTI may be encoded by base station 205 in the DCI.

At 325, base station 305 may identify a candidate set of decoding candidates to which the control information is able to be mapped. Each decoding candidate may include one or more CCEs. At 330, base station 305 may select an actual set of decoding candidates to which the control information is to actually be mapped, from the candidate set of decoding candidates. At 335, base station 305 may map the control information into the actual set of decoding candidates. At 340, base station 305 may transmit the PDCCH including the control information within a search space including the actual set of decoding candidates. At 345, UE 315 may receive and decode the control information. For example, UE 315 may decode the control information based on the actual set of decoding candidates.

Figure 4:
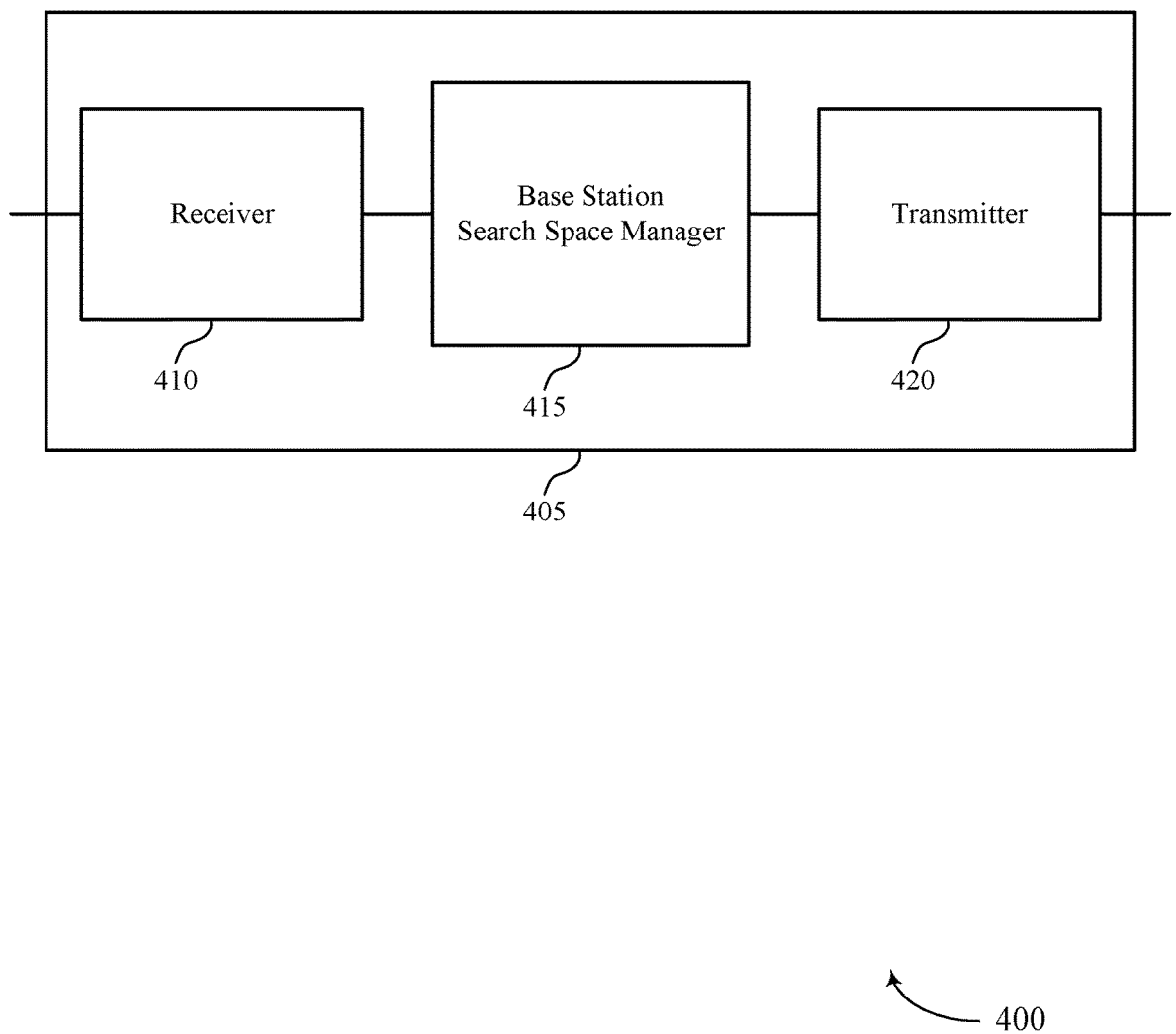
FIGS. 4 through 6 show block diagrams of a device that supports search space set hashing under channel estimation capability in accordance with aspects of the present disclosure.

FIG. 4 shows a block diagram 400 of a wireless device 405 that supports search space set hashing under channel estimation capability in accordance with aspects of the present disclosure. Wireless device 405 may be an example of aspects of a base station 105 as described herein. Wireless device 405 may include receiver 410, base station search space manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to search space set hashing under channel estimation capability, etc.). Information may be passed on to other components of the device. The receiver 410 may be an example of aspects of the transceiver 735 described with reference to FIG. 7. The receiver 410 may utilize a single antenna or a set of antennas.

Base station search space manager 415 may be an example of aspects of the base station search space manager 715 described with reference to FIG. 7. Base station search space manager 415 and/or at least some of its various sub-components may be implemented in hardware, software executed by a processor, firmware, or any combination thereof. If implemented in software executed by a processor, the functions of the base station search space manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station search space manager 415 and/or at least some of its various sub-components may be physically located at various positions, including being distributed such that portions of functions are implemented at different physical locations by one or more physical devices. In some examples, base station search space manager 415 and/or at least some of its various sub-components may be a separate and distinct component in accordance with various aspects of the present disclosure. In other examples, base station search space manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station search space manager 415 may identify control information for transmission on a downlink control channel, identify a candidate set of decoding candidates to which the control information is able to be mapped, each decoding candidate including one or more CCEs, select, from the candidate set of decoding candidates, an actual set of decoding candidates to which the control information is to actually be mapped, and map the control information into the actual set of decoding candidates.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas. Transmitter 420 may transmit the control information within a search space including the actual set of decoding candidates.

Figure 5:
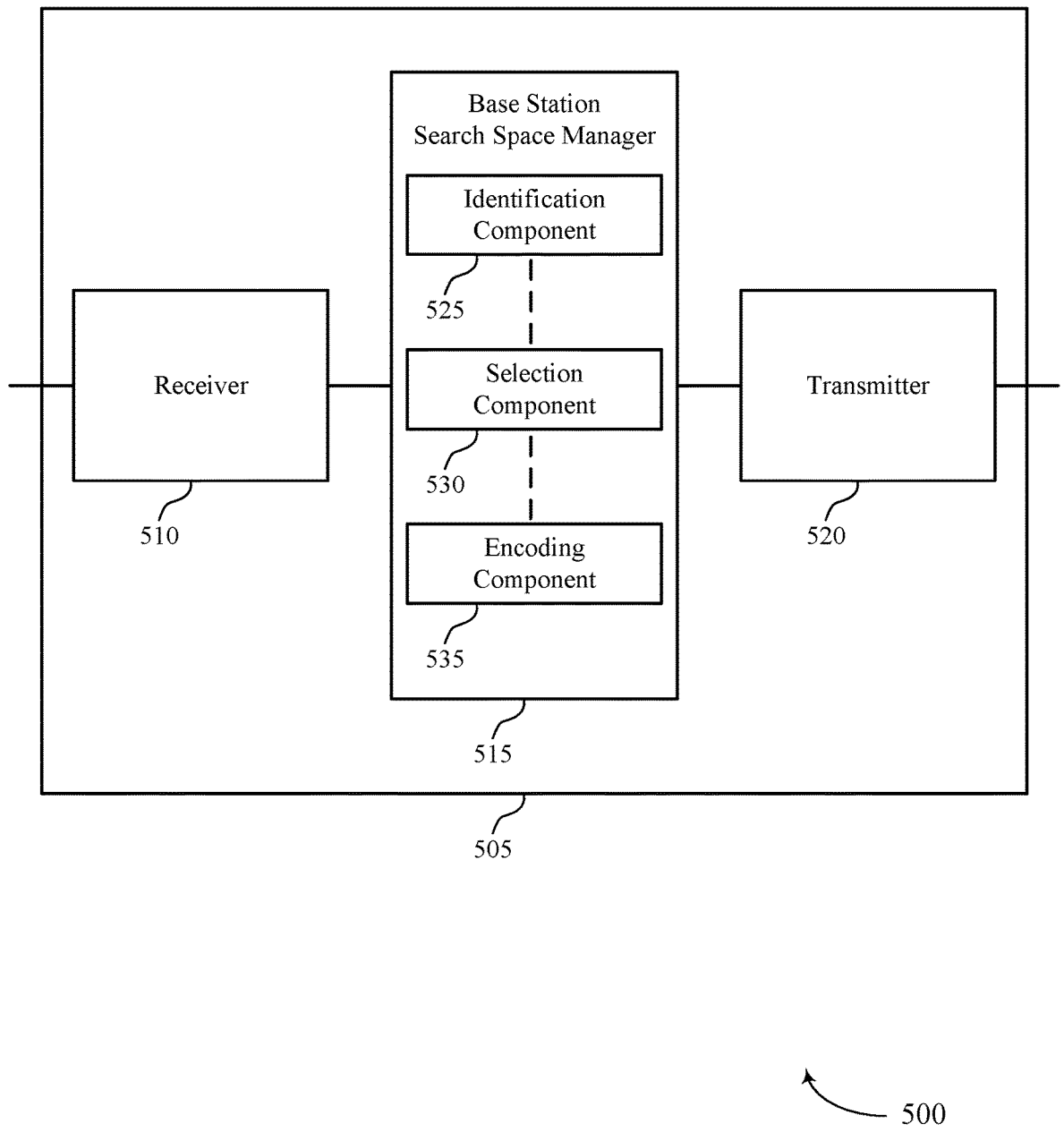

FIG. 5 shows a block diagram 500 of a wireless device 505 that supports search space set hashing under channel estimation capability in accordance with aspects of the present disclosure. Wireless device 505 may be an example of aspects of a wireless device 405 or a base station 105 as described with reference to FIG. 4. Wireless device 505 may include receiver 510, base station search space manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to search space set hashing under channel estimation capability, etc.). Information may be passed on to other components of the device. The receiver 510 may be an example of aspects of the transceiver 735 described with reference to FIG. 7. The receiver 510 may utilize a single antenna or a set of antennas.

Base station search space manager 515 may be an example of aspects of the base station search space manager 715 described with reference to FIG. 7. Base station search space manager 515 may also include identification component 525, selection component 530, and encoding component 535.

Identification component 525 may identify control information for transmission on a downlink control channel and identify a candidate set of decoding candidates to which the control information is able to be mapped, each decoding candidate including one or more CCEs. Selection component 530 may select, from the candidate set of decoding candidates, an actual set of decoding candidates to which the control information is to actually be mapped. Encoding component 535 may map the control information into the actual set of decoding candidates.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
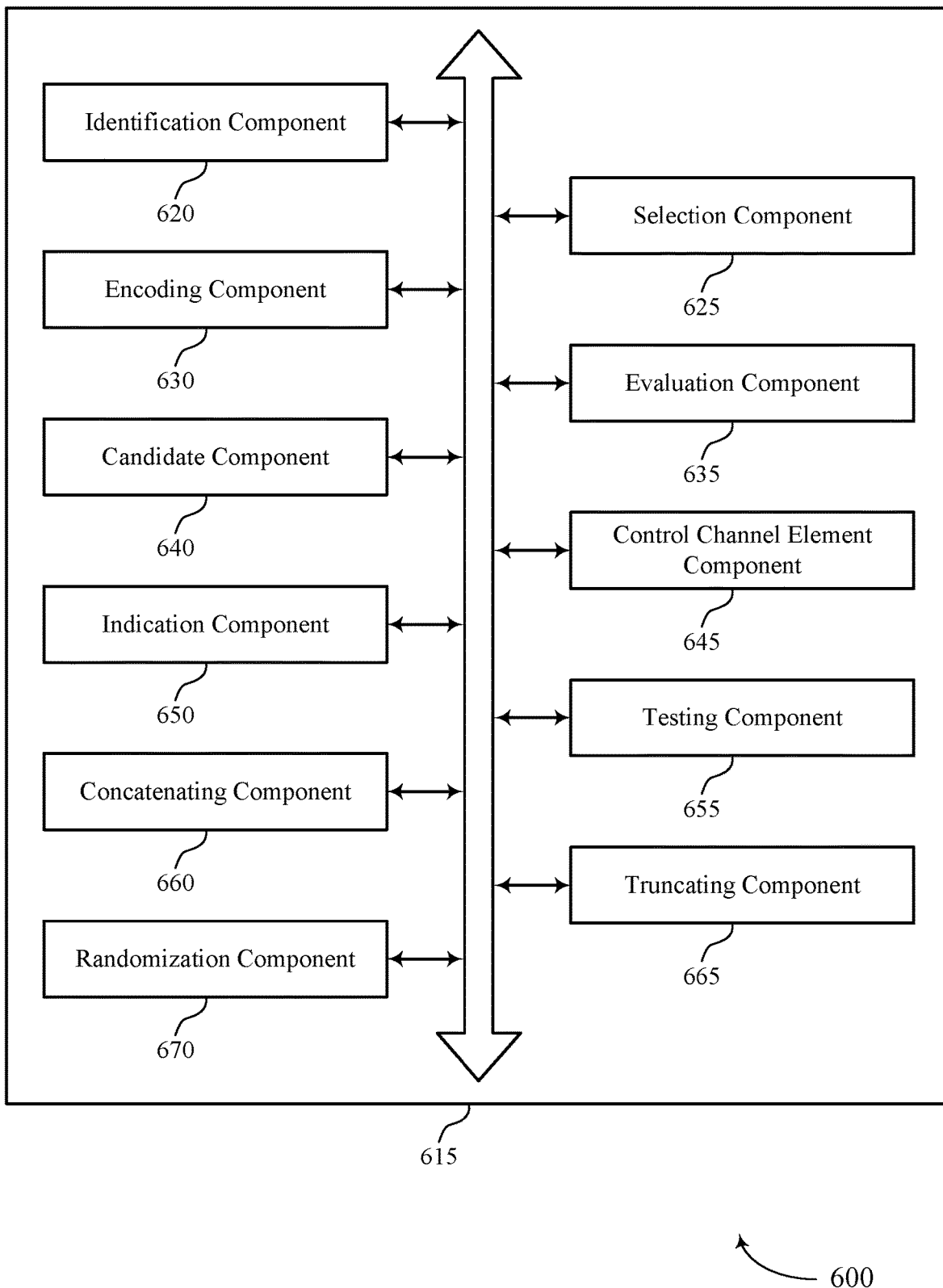

FIG. 6 shows a block diagram 600 of a base station search space manager 615 that supports search space set hashing under channel estimation capability in accordance with aspects of the present disclosure. The base station search space manager 615 may be an example of aspects of a base station search space manager 415, a base station search space manager 515, or a base station search space manager 715 described with reference to FIGS. 4, 5, and 7. The base station search space manager 615 may include identification component 620, selection component 625, encoding component 630, evaluation component 635, candidate component 640, control channel element component 645, indication component 650, testing component 655, concatenating component 660, truncating component 665, and randomization component 670. Each of these modules may communicate, directly or indirectly, with one another (e.g., via one or more buses).

Identification component 620 may identify control information for transmission on a downlink control channel and identify a candidate set of decoding candidates to which the control information is able to be mapped, each decoding candidate including one or more CCEs. Selection component 625 may select, from the candidate set of decoding candidates, an actual set of decoding candidates to which the control information is to actually be mapped. Encoding component 630 may map the control information into the actual set of decoding candidates.

Evaluation component 635 may evaluate decoding candidates of the candidate set sequentially for inclusion within the actual set of decoding candidates and evaluate decoding candidates of the candidate set in accordance with an order of evaluation. In some cases, the order may be based on an aggregation level of the decoding candidates of the candidate set.

Candidate component 640 may identify a decoding candidate of the candidate set to be evaluated. Candidate component 640 may compare the evaluation number of CCEs to a threshold. Candidate component 640 may determine whether to add the decoding candidate being evaluated to the actual set of decoding candidates based on the comparing. In some cases, candidate component 640 may add the decoding candidate being evaluated to the actual set of decoding candidates based on when the evaluation number of CCEs is less than or equal to the threshold. In some cases, candidate component 640 may drop the decoding candidate being evaluated from any inclusion in the actual set of decoding candidates when the evaluation number of CCEs is greater than the threshold. In some cases, candidate component 640 may drop the decoding candidate being evaluated and the candidate set of decoding candidates from the actual set of decoding candidates when the evaluation number of CCEs is greater than the threshold.

In some cases, candidate component 640 may identify an alternative decoding candidate, the alternative decoding candidate being of the same aggregation level as the decoding candidate being evaluated but not being within either the candidate set of decoding candidates or the actual set of decoding candidates. In some cases, candidate component 640 may add the alternative decoding candidate to the actual set of decoding candidates. Candidate component 640 may identify, from the candidate set of decoding candidates, a set of decoding candidates for each aggregation level. In some cases, the threshold is a maximum number of CCEs on which a UE receiving the control information is able to perform channel estimation for a downlink transmission and process a physical downlink control channel associated with the downlink transmission.

Control channel element component 645 may identify a number of CCEs in the decoding candidate being evaluated. In some cases, control channel element component 645 may determine an evaluation number of CCEs by adding the number of CCEs in the decoding candidate being evaluated to a number of CCEs already included within the actual set. Control channel element component 645 may determine the number of CCEs already included within the actual set by accounting for any overlapping CCEs of decoding candidates already included within the actual set.

Indication component 650 may receive, from a UE, an indication of the maximum number of CCEs on which the UE is able to perform channel estimation for a downlink transmission. Testing component 655 may test decoding candidates based on a sequentially increasing offset value. Concatenating component 660 may concatenate the sets of decoding candidates for each aggregation level into a single set of decoding candidates, accounting for any overlapping decoding candidates.

Truncating component 665 may truncate the single set of decoding candidates to form the actual set of decoding candidates such that a number of CCEs in the actual set of decoding candidates does not exceed a maximum number of CCEs on which a UE receiving the control information is able to perform channel estimation for a downlink transmission. Randomization component 670 may randomize the single set of decoding candidates based on a transmission slot, an identifier of the UE, or combinations of the same.

Figure 7:
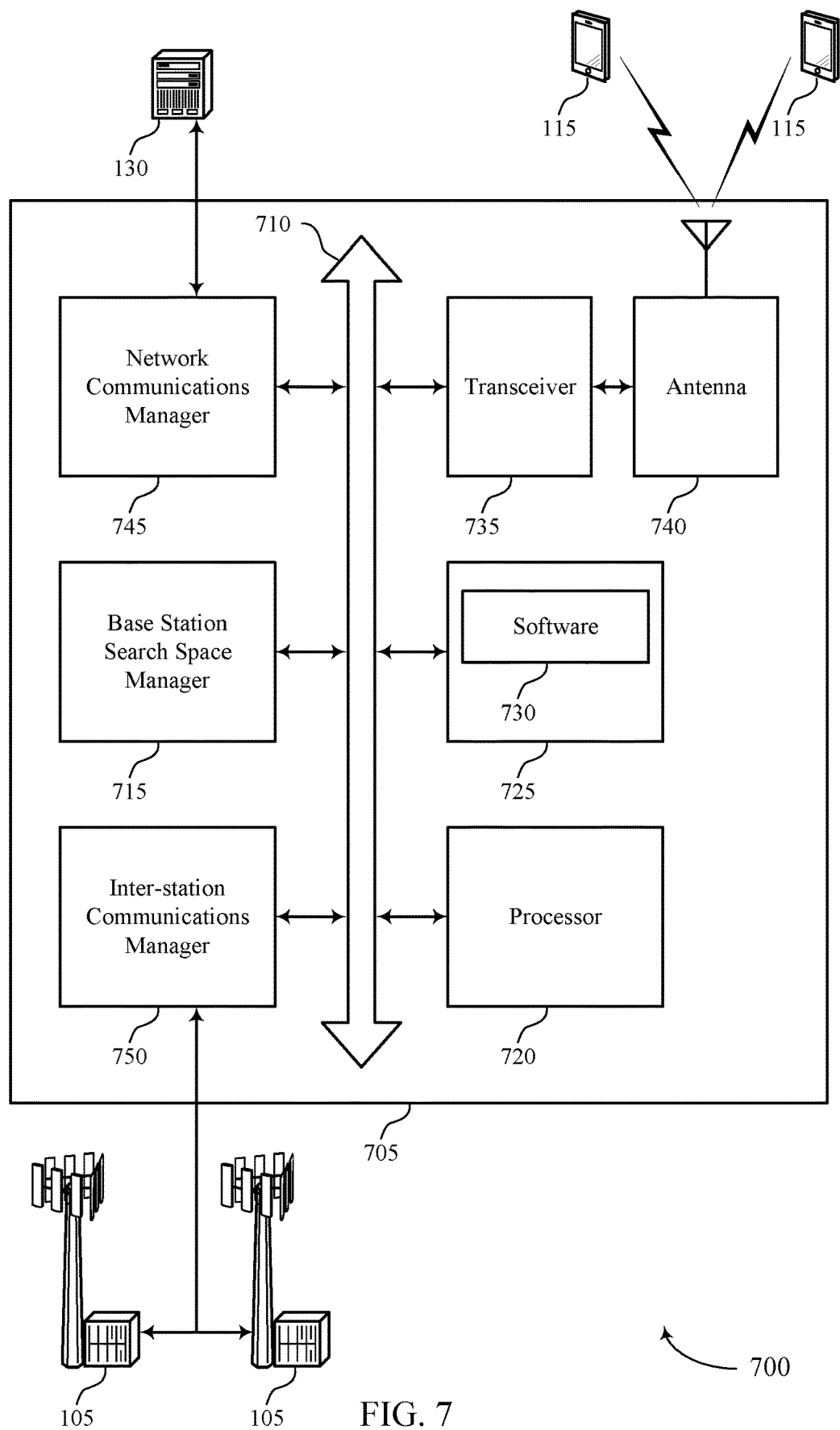
FIG. 7 illustrates a block diagram of a system including a base station that supports search space set hashing under channel estimation capability in accordance with aspects of the present disclosure.

FIG. 7 shows a diagram of a system 700 including a device 705 that supports search space set hashing under channel estimation capability in accordance with aspects of the present disclosure. Device 705 may be an example of or include the components of wireless device 405, wireless device 505, or a base station 105 as described above, e.g., with reference to FIGS. 4 and 5. Device 705 may include components for bi-directional voice and data communications including components for transmitting and receiving communications, including base station search space manager 715, processor 720, memory 725, software 730, transceiver 735, antenna 740, network communications manager 745, and inter-station communications manager 750. These components may be in electronic communication via one or more buses (e.g., bus 710). Device 705 may communicate wirelessly with one or more UEs 115.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting search space set hashing under channel estimation capability).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support search space set hashing under channel estimation capability. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in some cases the device may have more than one antenna 740, which may be capable of concurrently transmitting or receiving multiple wireless transmissions.

Network communications manager 745 may manage communications with the core network (e.g., via one or more wired backhaul links). For example, the network communications manager 745 may manage the transfer of data communications for client devices, such as one or more UEs 115.

Inter-station communications manager 750 may manage communications with other base station 105, and may include a controller or scheduler for controlling communications with UEs 115 in cooperation with other base stations 105. For example, the inter-station communications manager 750 may coordinate scheduling for transmissions to UEs 115 for various interference mitigation techniques such as beamforming or joint transmission. In some examples, inter-station communications manager 750 may provide an X2 interface within an Long Term Evolution (LTE)/LTE-A wireless communication network technology to provide communication between base stations 105.

Figure 8:
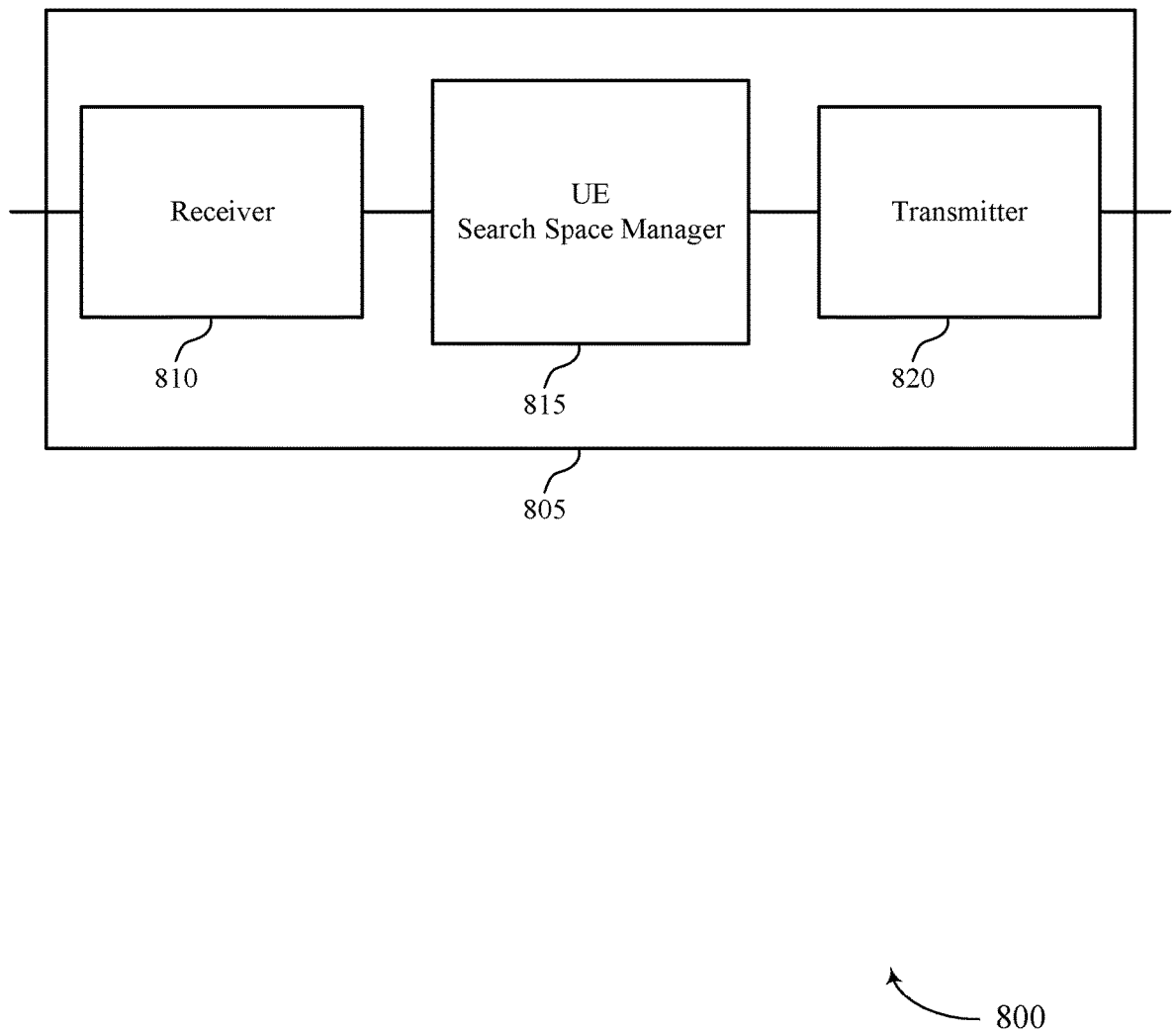
FIGS. 8 through 10 show block diagrams of a device that supports search space set hashing under channel estimation capability in accordance with aspects of the present disclosure.

FIG. 8 shows a block diagram 800 of a wireless device 805 that supports search space set hashing under channel estimation capability in accordance with aspects of the present disclosure. Wireless device 805 may be an example of aspects of a UE 115 as described herein. Wireless device 805 may include receiver 810, UE search space manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to search space set hashing under channel estimation capability, etc.). Information may be passed on to other components of the device. The receiver 810 may be an example of aspects of the transceiver 1135 described with reference to FIG. 11. The receiver 810 may utilize a single antenna or a set of antennas.

UE search space manager 815 may be an example of aspects of the UE search space manager 1115 described with reference to FIG. 11. UE search space manager 815 and/or at least some of its various sub-components may be implemented in hardware, software executed by a processor, firmware, or any combination thereof. If implemented in software executed by a processor, the functions of the UE search space manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE search space manager 815 and/or at least some of its various sub-components may be physically located at various positions, including being distributed such that portions of functions are implemented at different physical locations by one or more physical devices. In some examples, UE search space manager 815 and/or at least some of its various sub-components may be a separate and distinct component in accordance with various aspects of the present disclosure. In other examples, UE search space manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE search space manager 815 may receive control information within a search space including a set of decoding candidates and decode the control information based on the set of decoding candidates.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
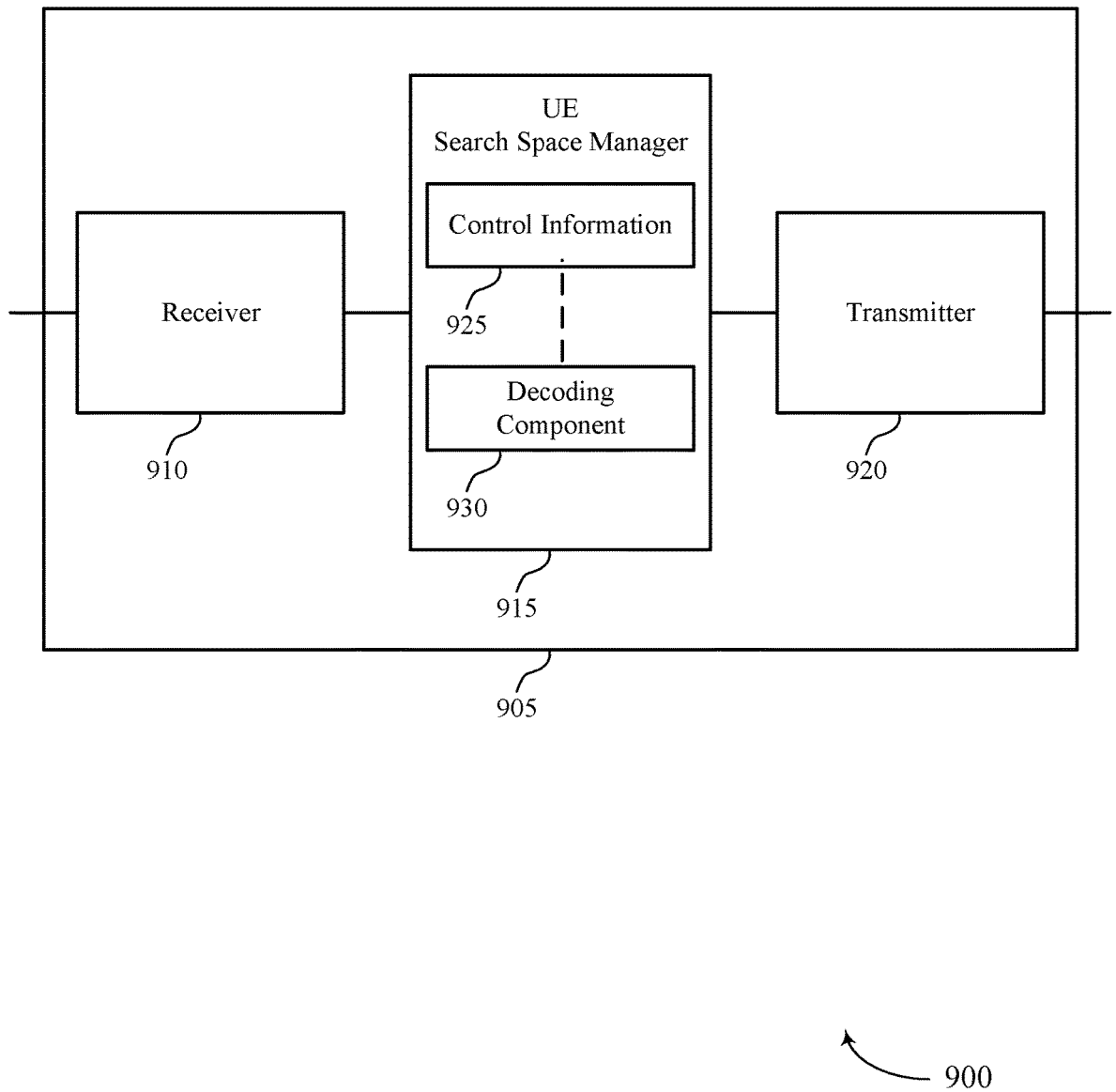

FIG. 9 shows a block diagram 900 of a wireless device 905 that supports search space set hashing under channel estimation capability in accordance with aspects of the present disclosure. Wireless device 905 may be an example of aspects of a wireless device 805 or a UE 115 as described with reference to FIG. 8. Wireless device 905 may include receiver 910, UE search space manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to search space set hashing under channel estimation capability, etc.). Information may be passed on to other components of the device. The receiver 910 may be an example of aspects of the transceiver 1135 described with reference to FIG. 11. The receiver 910 may utilize a single antenna or a set of antennas.

UE search space manager 915 may be an example of aspects of the UE search space manager 1115 described with reference to FIG. 11. UE search space manager 915 may also include control information 925 and decoding component 930. Control information 925 may receive control information 925 within a search space including a set of decoding candidates. Decoding component 930 may decode the control information based on the set of decoding candidates.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
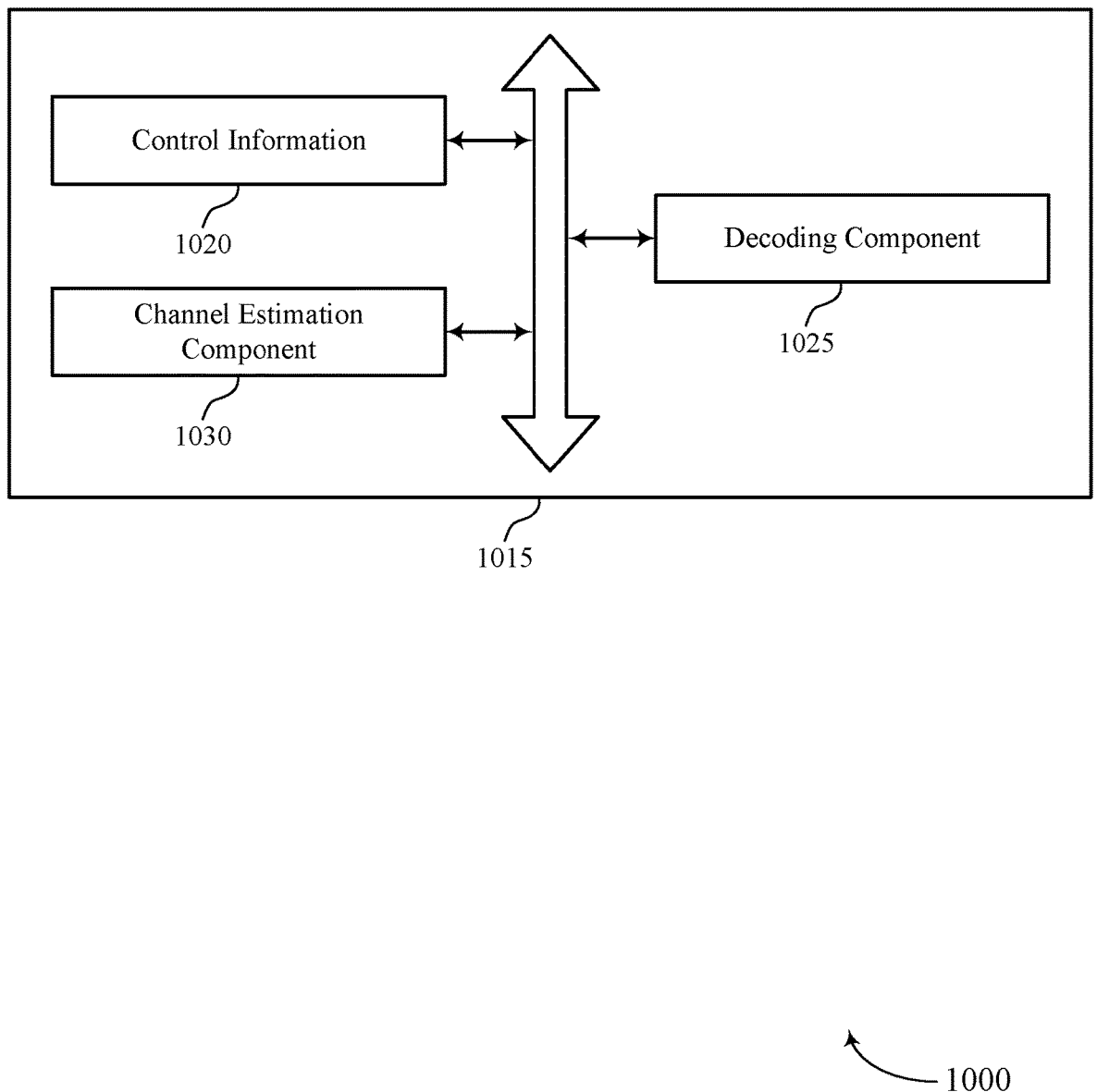

FIG. 10 shows a block diagram 1000 of a UE search space manager 1015 that supports search space set hashing under channel estimation capability in accordance with aspects of the present disclosure. The UE search space manager 1015 may be an example of aspects of a UE search space manager 1115 described with reference to FIGS. 8, 9, and 11. The UE search space manager 1015 may include control information 1020, decoding component 1025, and channel estimation component 1030. Each of these modules may communicate, directly or indirectly, with one another (e.g., via one or more buses).

Control information 1020 may receive control information 1020 within a search space including a set of decoding candidates. Decoding component 1025 may decode the control information based on the set of decoding candidates.

Control information 1020 may receive the control information within the search space including actual set of decoding candidates.

Decoding component 1025 may identify a candidate set of decoding candidates to which the control information is mapped, each decoding candidate may include one or more CCEs. The decoding component 1025 may select, from the candidate set of decoding candidates, an actual set of decoding candidates on which the UE is actually able to decode the control information. In some examples, the control information is decoded based at least in part on the actual set of decoding candidates.

Decoding component 1025 may evaluate decoding candidates of the candidate set in accordance with an order of evaluation, the order being based at least in part on an aggregation level of the decoding candidates of the candidate set. In some examples, the decoding component 1025 may identify a decoding candidate of the candidate set to be evaluated, and a number of CCEs in the decoding candidate being evaluated. Following the identification, the decoding component 1025 may determine an evaluation number of CCEs by adding the number of CCEs in the decoding candidate being evaluated to a number of CCEs already included within the actual set, and compare the evaluation number of CCEs to a threshold. The decoding component 1025 may determine whether to add the decoding candidate being evaluated to the actual set of decoding candidates based at least in part on the comparing. In some examples, the threshold may be a maximum number of CCEs on which channel estimation for a downlink transmission may be performed.

Decoding component 1025 may determine the number of CCEs already included within the actual set by accounting for any overlapping CCEs of decoding candidates already included within the actual set. In some cases, the decoding component 1025 may add the decoding candidate being evaluated to the actual set of decoding candidates based at least in part on when the evaluation number of CCEs is less than or equal to the threshold. Alternatively, the decoding component 1025 may drop the decoding candidate being evaluated and the candidate set of decoding candidates from the actual set of decoding candidates when the evaluation number of CCEs is greater than the threshold. In some cases, the decoding component 1025 may drop the decoding candidate being evaluated from any inclusion in the actual set of decoding candidates when the evaluation number of CCEs is greater than the threshold. The decoding component 1025 may identify an alternative decoding candidate. The alternative decoding candidate being of a same aggregation level as the decoding candidate being evaluated but not being within either the candidate set of decoding candidates or the actual set of decoding candidates, and add the alternative decoding candidate to the actual set of decoding candidates. The decoding component 1025 may test decoding candidates based at least in part on a sequentially increasing offset value.

Decoding component 1025 may select an actual set of decoding candidates by identifying, from the candidate set of decoding candidates, a set of decoding candidates for each aggregation level, and concatenating the sets of decoding candidates for each aggregation level into a single set of decoding candidates, accounting for any overlapping decoding candidates. The decoding component 1025 may truncate the single set of decoding candidates to form the actual set of decoding candidates such that a number of CCEs in the actual set of decoding candidates does not exceed a maximum number of CCEs. Channel estimation component 1030 may transmit, an indication of a maximum number of CCEs on which a UE is able to perform channel estimation for a downlink transmission and process a physical downlink control channel associated with the downlink transmission.

Figure 11:
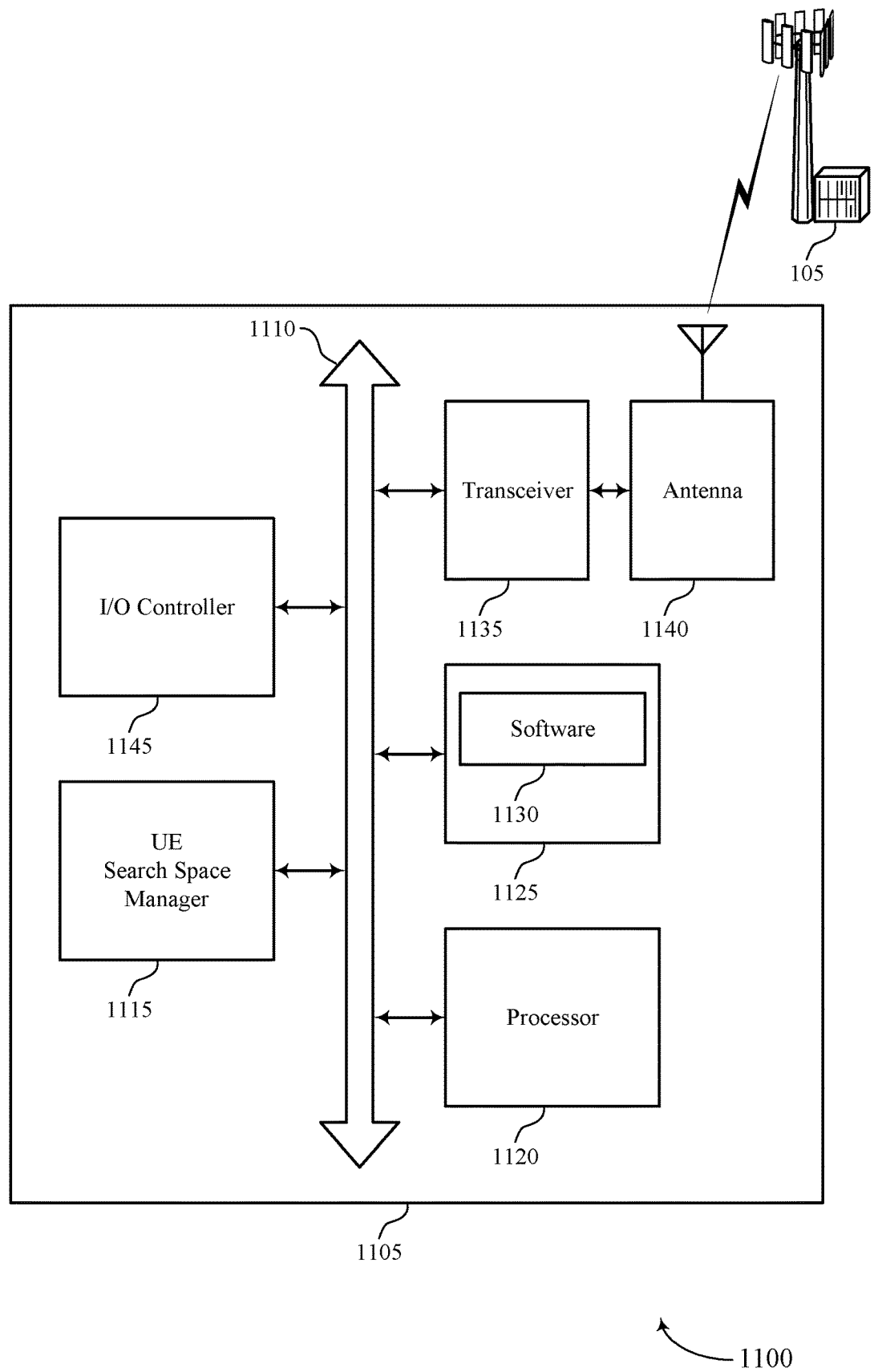
FIG. 11 illustrates a block diagram of a system including a UE that supports search space set hashing under channel estimation capability in accordance with aspects of the present disclosure.

FIG. 11 shows a diagram of a system 1100 including a device 1105 that supports search space set hashing under channel estimation capability in accordance with aspects of the present disclosure. Device 1105 may be an example of or include the components of UE 115 as described above, e.g., with reference to FIG. 1. Device 1105 may include components for bi-directional voice and data communications including components for transmitting and receiving communications, including UE search space manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting search space set hashing under channel estimation capability).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support search space set hashing under channel estimation capability. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
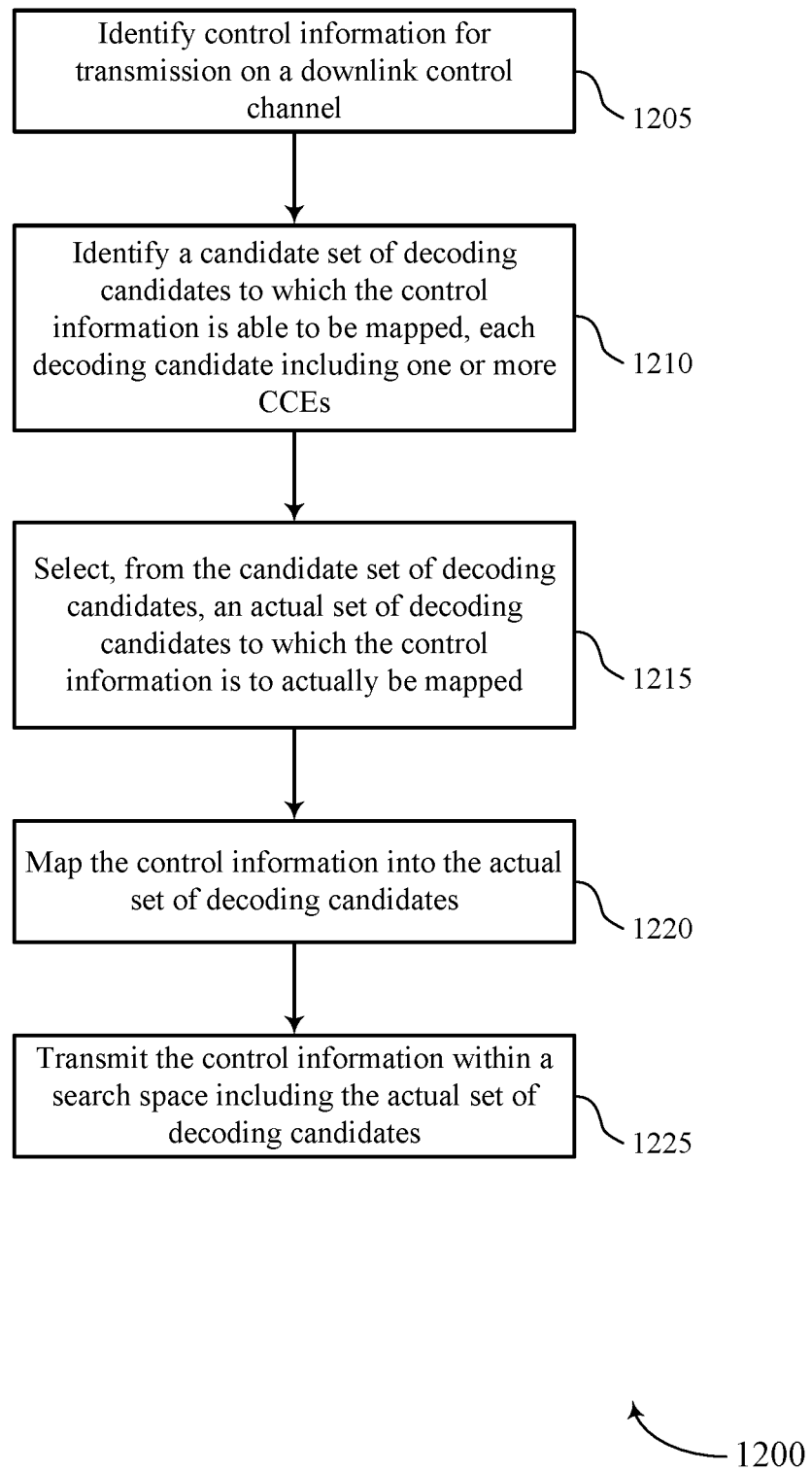
FIGS. 12 through 16 illustrate methods for search space set hashing under channel estimation capability in accordance with aspects of the present disclosure.

FIG. 12 shows a flowchart illustrating a method 1200 for search space set hashing under channel estimation capability in accordance with aspects of the present disclosure. The operations of method 1200 may be implemented by a base station 105 or its components as described herein. For example, the operations of method 1200 may be performed by a base station search space manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At 1205 the base station 105 may identify control information for transmission on a downlink control channel. The operations of 1205 may be performed according to the methods described herein. In certain examples, aspects of the operations of 1205 may be performed by an identification component as described with reference to FIGS. 4 through 7.

At 1210 the base station 105 may identify a candidate set of decoding candidates to which the control information is able to be mapped, each decoding candidate including one or more CCEs. The operations of 1210 may be performed according to the methods described herein. In certain examples, aspects of the operations of 1210 may be performed by an identification component as described with reference to FIGS. 4 through 7.

At 1215 the base station 105 may select, from the candidate set of decoding candidates, an actual set of decoding candidates to which the control information is to actually be mapped. The operations of 1215 may be performed according to the methods described herein. In certain examples, aspects of the operations of 1215 may be performed by a selection component as described with reference to FIGS. 4 through 7.

At 1220 the base station 105 may map the control information into the actual set of decoding candidates. The operations of 1220 may be performed according to the methods described herein. In certain examples, aspects of the operations of 1220 may be performed by a encoding component as described with reference to FIGS. 4 through 7.

At 1225 the base station 105 may transmit the control information within a search space including the actual set of decoding candidates. The operations of 1225 may be performed according to the methods described herein. In certain examples, aspects of the operations of 1225 may be performed by a transmitter as described with reference to FIGS. 4 through 7.

Figure 13:
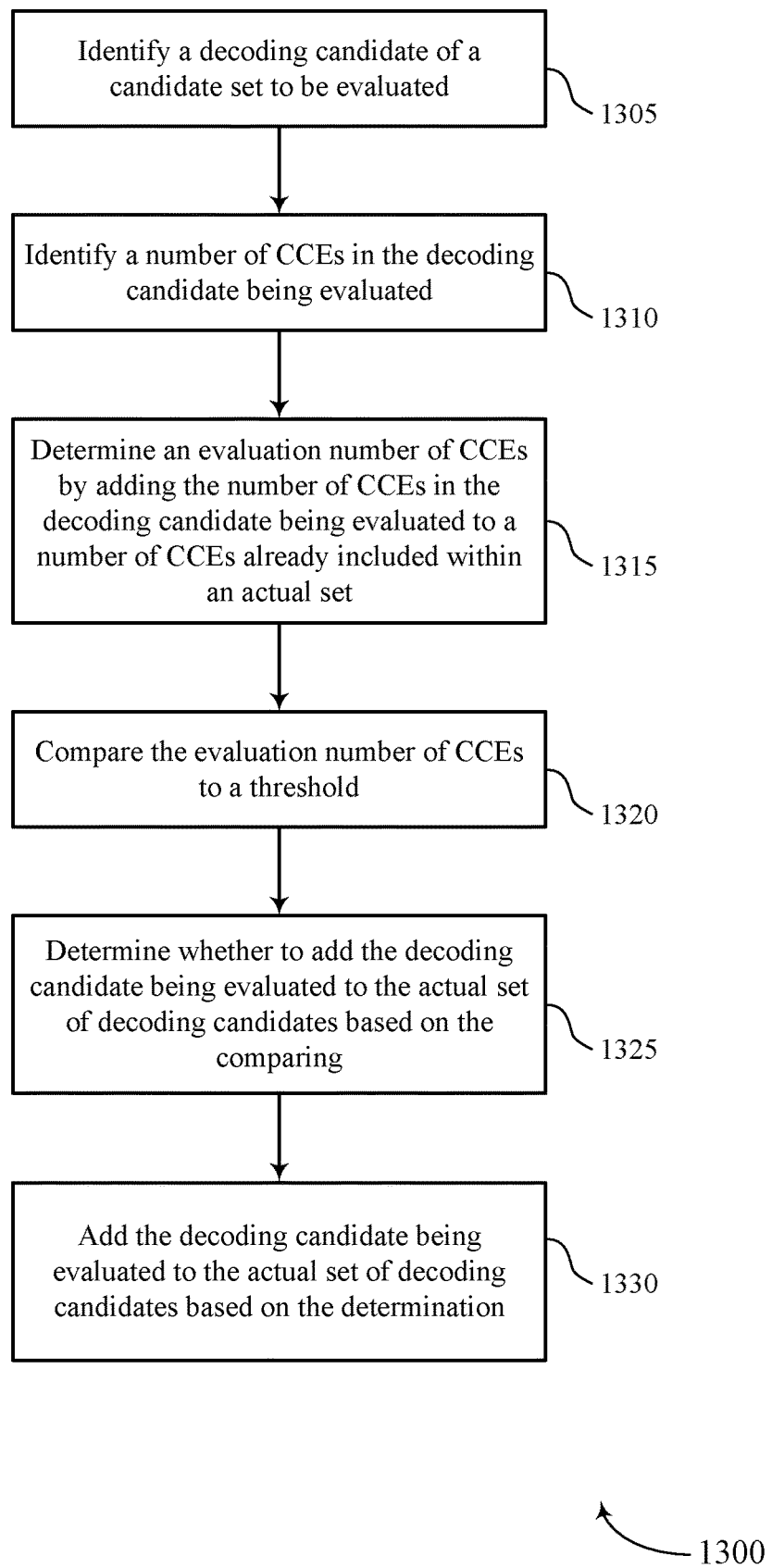

FIG. 13 shows a flowchart illustrating a method 1300 for search space set hashing under channel estimation capability in accordance with aspects of the present disclosure. The operations of method 1300 may be implemented by a base station 105 or its components as described herein. For example, the operations of method 1300 may be performed by a base station search space manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At 1305 the base station 105 may identify a decoding candidate of a candidate set to be evaluated. The operations of 1305 may be performed according to the methods described herein. In certain examples, aspects of the operations of 1305 may be performed by a candidate component as described with reference to FIGS. 4 through 7.

At 1310 the base station 105 may identify a number of CCEs in the decoding candidate being evaluated. The operations of 1310 may be performed according to the methods described herein. In certain examples, aspects of the operations of 1310 may be performed by a control channel element component as described with reference to FIGS. 4 through 7.

At 1315 the base station 105 may determine an evaluation number of CCEs by adding the number of CCEs in the decoding candidate being evaluated to a number of CCEs already included within an actual set. The operations of 1315 may be performed according to the methods described herein. In certain examples, aspects of the operations of 1315 may be performed by a control channel element component as described with reference to FIGS. 4 through 7.

At 1320 the base station 105 may compare the evaluation number of CCEs to a threshold. The operations of 1320 may be performed according to the methods described herein. In certain examples, aspects of the operations of 1320 may be performed by a candidate component as described with reference to FIGS. 4 through 7.

At 1325 the base station 105 may determine whether to add the decoding candidate being evaluated to the actual set of decoding candidates based on the comparing. The operations of 1325 may be performed according to the methods described herein. In certain examples, aspects of the operations of 1325 may be performed by a candidate component as described with reference to FIGS. 4 through 7.

At 1330 the base station 105 may add the decoding candidate being evaluated to the actual set of decoding candidates based on the determination. The operations of 1330 may be performed according to the methods described herein. In certain examples, aspects of the operations of 1330 may be performed by an evaluation component as described with reference to FIGS. 4 through 7.

Figure 14:
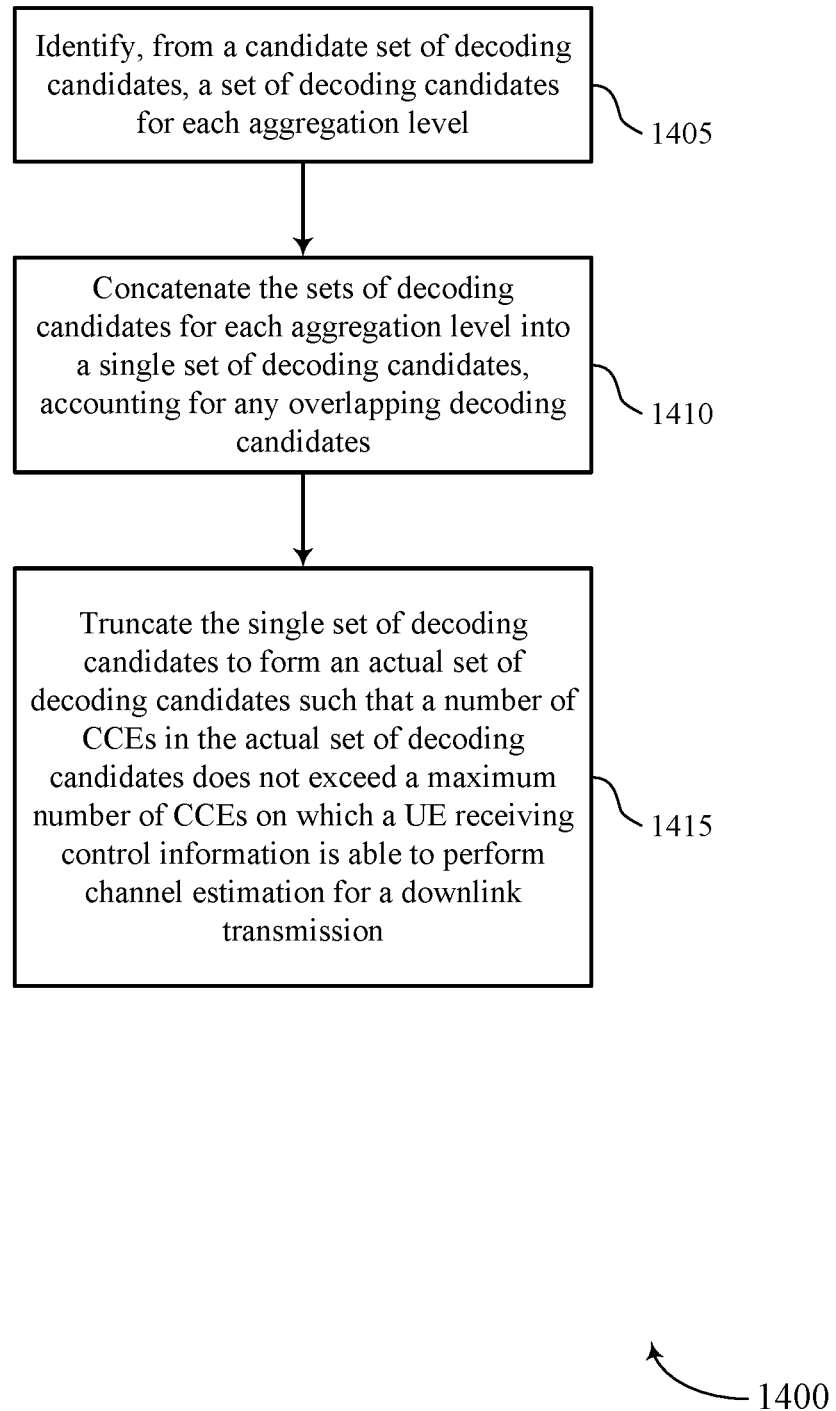

FIG. 14 shows a flowchart illustrating a method 1400 for search space set hashing under channel estimation capability in accordance with aspects of the present disclosure. The operations of method 1400 may be implemented by a base station 105 or its components as described herein. For example, the operations of method 1400 may be performed by a base station search space manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At 1405 the base station 105 may identify, from a candidate set of decoding candidates, a set of decoding candidates for each aggregation level. The operations of 1405 may be performed according to the methods described herein. In certain examples, aspects of the operations of 1405 may be performed by a candidate component as described with reference to FIGS. 4 through 7.

At 1410 the base station 105 may concatenate the sets of decoding candidates for each aggregation level into a single set of decoding candidates, accounting for any overlapping decoding candidates. The operations of 1410 may be performed according to the methods described herein. In certain examples, aspects of the operations of 1410 may be performed by a concatenating component as described with reference to FIGS. 4 through 7.

At 1415 the base station 105 may truncate the single set of decoding candidates to form an actual set of decoding candidates such that a number of CCEs in the actual set of decoding candidates does not exceed a maximum number of CCEs on which a UE receiving control information is able to perform channel estimation for a downlink transmission. The operations of 1415 may be performed according to the methods described herein. In certain examples, aspects of the operations of 1415 may be performed by a truncating component as described with reference to FIGS. 4 through 7.

Figure 15:
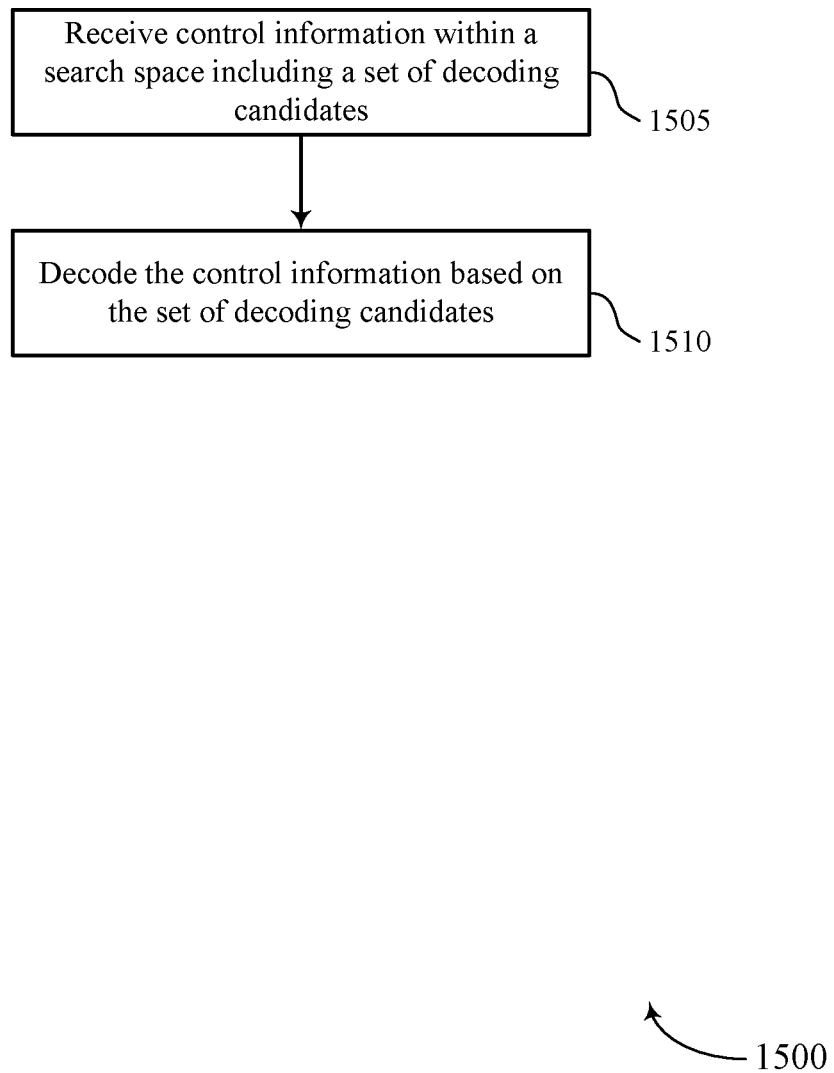

FIG. 15 shows a flowchart illustrating a method 1500 for search space set hashing under channel estimation capability in accordance with aspects of the present disclosure. The operations of method 1500 may be implemented by a UE 115 or its components as described herein. For example, the operations of method 1500 may be performed by a UE search space manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive control information within a search space comprising a set of decoding candidates. The operations of 1505 may be performed according to the methods described herein. In certain examples, aspects of the operations of 1505 may be performed by a control information as described with reference to FIGS. 8 through 11.

At 1510 the UE 115 may decode the control information based at least in part on the set of decoding candidates. The operations of 1510 may be performed according to the methods described herein. In certain examples, aspects of the operations of 1510 may be performed by a decoding component as described with reference to FIGS. 8 through 11.

Figure 16:
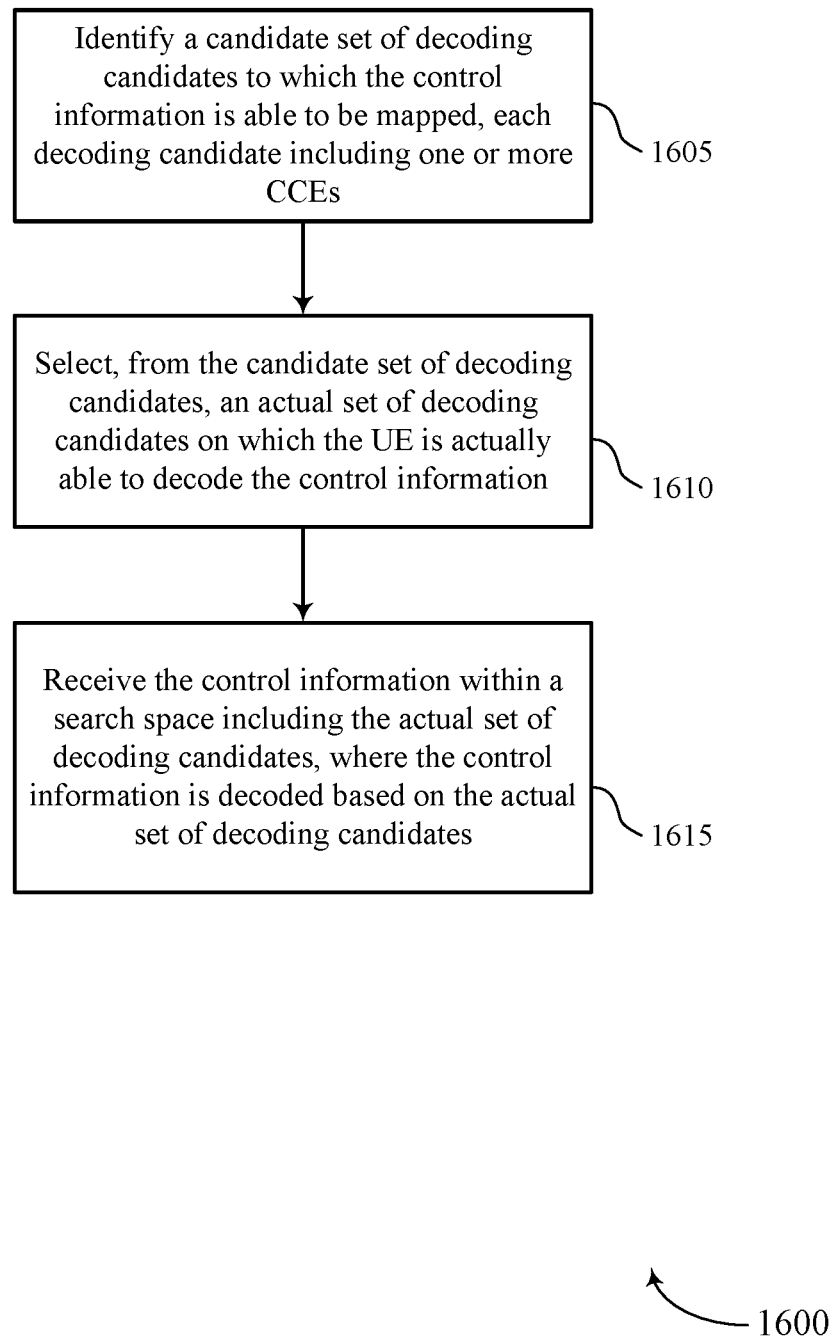

FIG. 16 shows a flowchart illustrating a method 1600 for search space set hashing under channel estimation capability in accordance with aspects of the present disclosure. The operations of method 1600 may be implemented by a UE 115 or its components as described herein. For example, the operations of method 1600 may be performed by a UE search space manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may identify a candidate set of decoding candidates to which the control information is able to be mapped, each decoding candidate including one or more CCEs. The operations of 1605 may be performed according to the methods described herein. In certain examples, aspects of the operations of 1605 may be performed by a decoding component as described with reference to FIGS. 8 through 11.

At 1610 the UE 115 may select, from the candidate set of decoding candidates, an actual set of decoding candidates on which the UE 115 is actually able to decode the control information. The operations of 1610 may be performed according to the methods described herein. In certain examples, aspects of the operations of 1610 may be performed by a decoding component as described with reference to FIGS. 8 through 11.

At 1615 the UE 115 may receive the control information within a search space including the actual set of decoding candidates, where the control information is decoded based on the actual set of decoding candidates. The operations of 1615 may be performed according to the methods described herein. In certain examples, aspects of the operations of 1615 may be performed by a control information component as described with reference to FIGS. 8 through 11

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

System 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
   identifying control information for transmission on a downlink control channel;
   identifying a candidate set of decoding candidates to which the control information is configured to be mapped, each decoding candidate comprising one or more control channel elements (CCEs);
   selecting, from the candidate set of decoding candidates, an actual set of decoding candidates to which the control information is to actually be mapped, the selecting comprising evaluating decoding candidates by:
      identifying a decoding candidate of the candidate set to be evaluated;
      identifying a number of CCEs in the decoding candidate being evaluated;
      determining an evaluation number of CCEs by adding the number of CCEs in the decoding candidate being evaluated to a number of CCEs already included within the actual set;
      comparing the evaluation number of CCEs to a threshold; and
      determining whether to add the decoding candidate being evaluated to the actual set of decoding candidates based at least in part on the comparing;
   mapping the control information into the actual set of decoding candidates; and
   transmitting the control information within a search space comprising the actual set of decoding candidates.

2. The method of claim 1, wherein selecting the actual set of decoding candidates further comprises:
   evaluating each decoding candidate of the candidate set sequentially for inclusion within the actual set of decoding candidates.

3. The method of claim 1, wherein selecting the actual set of decoding candidates further comprises:
   evaluating each decoding candidate of the candidate set in accordance with an order of evaluation.

4. The method of claim 1, wherein the threshold is a maximum number of CCEs on which a user equipment (UE) receiving the control information is configured to perform channel estimation for a downlink transmission and process a physical downlink control channel associated with the downlink transmission.

5. The method of claim 4, further comprising:
   receiving, from the UE, an indication of the maximum number of CCEs on which the UE is configured to perform channel estimation for the downlink transmission.

6. The method of claim 1, further comprising:
   determining the number of CCEs already included within the actual set by accounting for any overlapping CCEs of decoding candidates already included within the actual set.

7. The method of claim 1, wherein determining whether to add the decoding candidate being evaluated to the actual set of decoding candidates comprises:
   adding the decoding candidate being evaluated to the actual set of decoding candidates based at least in part on when the evaluation number of CCEs is less than or equal to the threshold.

8. The method of claim 1, wherein determining whether to add the decoding candidate being evaluated to the actual set of decoding candidates comprises:
   dropping the decoding candidate being evaluated from the actual set of decoding candidates when the evaluation number of CCEs is greater than the threshold.

9. The method of claim 1, wherein determining whether to add the decoding candidate being evaluated to the actual set of decoding candidates comprises:

dropping the decoding candidate being evaluated from any inclusion in the actual set of decoding candidates when the evaluation number of CCEs is greater than the threshold.

10. The method of claim 9, further comprising:

identifying an alternative decoding candidate, the alternative decoding candidate being of a same aggregation level as the decoding candidate being evaluated but not being within either the candidate set of decoding candidates or the actual set of decoding candidates; and adding the alternative decoding candidate to the actual set of decoding candidates.

11. The method of claim 10, wherein identifying the alternative decoding candidate comprises:

testing decoding candidates based at least in part on a sequentially increasing offset value.

12. The method of claim 1, wherein selecting the actual set of decoding candidates further comprises:

identifying, from the candidate set of decoding candidates, a set of decoding candidates for each aggregation level;

concatenating the sets of decoding candidates for each aggregation level into a single set of decoding candidates, accounting for any overlapping decoding candidates; and truncating the single set of decoding candidates to form the actual set of decoding candidates such that a number of CCEs in the actual set of decoding candidates does not exceed a maximum number of CCEs on which a user equipment (UE) receiving the control information is configured to perform channel estimation for a downlink transmission.

13. The method of claim 12, further comprising:

randomizing the single set of decoding candidates based at least in part on a transmission slot, an identifier of the UE, or combinations of the same.

14. An apparatus for wireless communication, comprising:

a processor;

memory in electronic communication with the processor; and instructions stored in the memory and executable by the processor to cause the apparatus to:

identify control information for transmission on a downlink control channel;

identify a candidate set of decoding candidates to which the control information is configured to be mapped, each decoding candidate comprising one or more control channel elements (CCEs);

select, from the candidate set of decoding candidates, an actual set of decoding candidates to which the control information is to actually be mapped, wherein the instructions executable by the processor to cause the apparatus to select the actual set of decoding candidates further comprise instructions executable by the processor to cause the apparatus to:

identify a decoding candidate of the candidate set to be evaluated:

identify a number of CCEs in the decoding candidate being evaluated:

determine an evaluation number of CCEs by adding the number of CCEs in the decoding candidate being evaluated to a number of CCEs already included within the actual set;

compare the evaluation number of CCEs to a threshold; and determine whether to add the decoding candidate being evaluated to the actual set of decoding candidates based at least in part on the comparison;

map the control information into the actual set of decoding candidates; and transmit the control information within a search space comprising the actual set of decoding candidates.

* * * * *